US008887231B2

(12) United States Patent
Wohlert

(10) Patent No.: US 8,887,231 B2
(45) Date of Patent: Nov. 11, 2014

(54) FEMTOCELL ACCESS PROVISIONING BASED ON SOCIAL NETWORK, PRESENCE, AND USER PREFERENCES

(75) Inventor: Randolph Wohlert, Austin, TX (US)

(73) Assignee: AT&T Intellectual Property I, LP, Atlanta, GA (US)

( * ) Notice: Subject to any disclaimer, the term of this patent is extended or adjusted under 35 U.S.C. 154(b) by 286 days.

(21) Appl. No.: 12/845,513

(22) Filed: Jul. 28, 2010

(65) Prior Publication Data

US 2012/0030734 A1   Feb. 2, 2012

(51) Int. Cl.
*G06F 7/04* (2006.01)
*H04L 29/06* (2006.01)
*H04W 84/04* (2009.01)

(52) U.S. Cl.
CPC ........... *H04L 63/101* (2013.01); *H04W 84/045* (2013.01)
USPC .................................................. 726/2; 726/3

(58) Field of Classification Search
None
See application file for complete search history.

(56) References Cited

U.S. PATENT DOCUMENTS

| | | | |
|---|---|---|---|
| 6,119,185 A * | 9/2000 | Westerinen et al. ........... | 710/104 |
| 8,144,853 B1 * | 3/2012 | Aboujaoude et al. ..... | 379/201.05 |
| 8,209,745 B2 * | 6/2012 | Huber et al. ....................... | 726/6 |
| 2003/0101254 A1 * | 5/2003 | Sato ............................. | 709/223 |
| 2004/0076139 A1 * | 4/2004 | Kang-Yeh et al. ............. | 370/349 |
| 2008/0141348 A1 * | 6/2008 | Hovnanian et al. ................ | 726/4 |
| 2009/0094680 A1 * | 4/2009 | Gupta et al. ........................ | 726/3 |
| 2009/0288152 A1 * | 11/2009 | Huber et al. ....................... | 726/6 |
| 2009/0292814 A1 * | 11/2009 | Ting et al. ...................... | 709/229 |
| 2010/0056104 A1 * | 3/2010 | Butler et al. .................... | 455/410 |
| 2010/0190533 A1 * | 7/2010 | Black et al. ..................... | 455/571 |
| 2010/0203866 A1 * | 8/2010 | Li et al. ........................... | 455/411 |
| 2010/0238919 A1 * | 9/2010 | Froelich ......................... | 370/352 |
| 2010/0268823 A1 * | 10/2010 | Torarp et al. ................... | 709/225 |
| 2011/0004636 A1 * | 1/2011 | Parkkinen et al. ............. | 707/803 |
| 2011/0039564 A1 * | 2/2011 | Johnstone et al. ............. | 455/436 |
| 2011/0045835 A1 * | 2/2011 | Chou et al. ..................... | 455/446 |
| 2011/0047011 A1 * | 2/2011 | Tirpak .......................... | 705/14.1 |
| 2011/0191417 A1 * | 8/2011 | Rathod ......................... | 709/204 |
| 2011/0196925 A1 * | 8/2011 | Hans et al. ..................... | 709/204 |
| 2011/0212729 A1 * | 9/2011 | Li et al. ........................... | 455/450 |
| 2011/0237240 A1 * | 9/2011 | Tsuda ......................... | 455/422.1 |
| 2011/0287761 A1 * | 11/2011 | Kozam ....................... | 455/422.1 |
| 2012/0044908 A1 * | 2/2012 | Spinelli et al. ................ | 370/331 |
| 2012/0129497 A1 * | 5/2012 | De Benedittis et al. ....... | 455/411 |
| 2012/0192258 A1 * | 7/2012 | Spencer et al. ................... | 726/7 |
| 2013/0303119 A1 * | 11/2013 | Huber et al. .................. | 455/410 |

* cited by examiner

*Primary Examiner* — Jeffrey Pwu
*Assistant Examiner* — Carlos Amorin
(74) *Attorney, Agent, or Firm* — Amin, Turocy & Watson, LLP

(57) ABSTRACT

A system and methodology that facilitates user friendly, automatic and/or dynamic femtocell access provisioning based on social network, presence, and/or user preference information is provided. In particular, the system can includes femto access manager that can identify a list of 'close friends', to which the femtocell owner is likely to grant femtocell access, based on an analysis of access data (e.g., data from social networks, communication logs, calendars, address books, websites and/or blogs, transaction related data, and the like). Further, an access priority associated with each of the close friends can be determined based in part on location data, availability data, and/or predefined policies. Furthermore, the femto access control list, within the femto access point (FAP), can be populated, dynamically and/or automatically, with the highest priority friends from the close friends list.

20 Claims, 13 Drawing Sheets

| NAME 1 | ACCESS PRIORITY 1 | MSISDN 1 | LOCATION 1 | STATUS 1 |
|---|---|---|---|---|
| NAME 2 | ACCESS PRIORITY 2 | MSISDN 2 | LOCATION 2 | STATUS 2 |
| NAME 3 | ACCESS PRIORITY 3 | MSISDN 3 | LOCATION 3 | STATUS 3 |
| ⋮ | ⋮ | ⋮ | ⋮ | ⋮ |
| NAME T-1 | ACCESS PRIORITY T-1 | MSISDN T-1 | LOCATION T-1 | STATUS T-1 |
| NAME T | ACCESS PRIORITY T | MSISDN T | LOCATION T | STATUS T |

FIG. 3

FEMTOCELL ACCESS PROVISIONING BASED ON SOCIAL NETWORK, PRESENCE, AND USER PREFERENCES

TECHNICAL FIELD

The subject disclosure relates to wireless communications and, more particularly, to a mechanism, that provides user-friendly automatic and/or dynamic femtocell access provisioning based on social network, presence, and/or user preference information.

BACKGROUND

Femtocells—building-based wireless access points interfaced with a wired broadband network—are traditionally deployed to improve indoor wireless coverage, and to offload a mobility radio access network (RAN) operated by a wireless service provider. Improved indoor coverage includes stronger signal and improved reception (e.g., voice, sound, or data), ease of session or call initiation, and session or call retention as well. Offloading a RAN reduces operational and transport costs for the service provider since a lesser number of end users utilizes over-the-air radio resources (e.g., radio frequency channels), which are typically limited. With the rapid increase in utilization of communications networks and/or devices, mobile data communications have been continually evolving due to increasing requirements of workforce mobility, and, services provided by femtocells can be extended beyond indoor coverage enhancement; for example, femtocells can be utilized in areas wherein macro coverage is not poor or weak.

Conventional femtocells enable a user/owner to manage access to femtocell service by manually creating and/or updating access control list(s), or "white list(s)." Typically, such white list(s) can be configured via a networked interface, which facilitates access management to a femtocell. The white list(s) includes a set of subscriber station(s) identifier numbers, codes or tokens, and can also include additional fields for femtocell access management based on desired complexity. Accordingly, the user/owner can update and personalize femto AP autonomously (e.g., free of interaction with technical support entities) at substantially any time. However, manually populating the access list(s) can be tedious for the user/owner.

In addition, the number of persons (e.g., friends and family) to which the user/owner can grant femtocell access is limited, and thus the user/owner has to frequently update the access list(s) to ensure that the appropriate persons are granted access. Frequent manual updates to the access list(s) can be a time-consuming task and can lead to customer dissatisfaction. Moreover, the traditional access list implementation and manual provisioning processes are far too cumbersome to accommodate the functionality that the user/owner desires.

SUMMARY

The following presents a simplified summary of the specification in order to provide a basic understanding of some aspects of the specification. This summary is not an extensive overview of the specification. It is intended to neither identify key or critical elements of the specification nor delineate any scope particular embodiments of the specification, or any scope of the claims. Its sole purpose is to present some concepts of the specification in a simplified form as a prelude to the more detailed description that is presented later.

The systems and methods disclosed herein, in one aspect thereof, can facilitate automatic and/or dynamic management of femtocell network access. In one aspect, the system can collect access data associated with the femtocell owner and/or authorized user, such as, but not limited to data from social networks, communication logs, calendars, address books, websites and/or blogs, transaction related data, and the like. Moreover, the system includes a femtocell access manager that can identify a list of 'close friends,' to which the owner and/or authorized user is likely to grant femtocell access, based in part on the analysis of the access data. Typically, the list is substantially larger in size/length than the limited length femto access control list in the femto access point (FAP). Further, the femtocell access manager can dynamically determine and/or update priority values for the 'close friends' based on various factors, such as, but not limited to, presence information (e.g., current location and status, user policies, service provider policies, etc.) and rank the list of close friends based on the access priority. In another aspect, the femtocell access manager can dynamically populate the access control list with the highest ranked close friends and automatically provision (and/or re-provision) the femto access control list, to grant/deny access to appropriate UEs.

In accordance with another aspect, the system facilitates dynamic and automatic generation and/or modification of an access control list in a FAP. The system can analyze access data and/or user input to determine a close friend of a user and the access priority of the close friend, to which to which femtocell access can be granted. Further, the system can determine whether an unoccupied entry is available in the access control list. If an unoccupied entry is available, the entry can be populated with information associated with the close friend (e.g., a unique device identity (ID)). However, if an unoccupied entry is not available, then the system can check whether an entry within the access control list has a lower priority than that of the close friend and replace the lower priority entry with information associated with the close friend. Alternately, if all entries within the access control list have a higher priority than that of the close friend, then the system can determine whether a higher priority entry is occupied by a UE that is not within the femtocell range (and/or not likely to enter the femtocell coverage area) or is within the femtocell range, but is not likely to communicate (e.g., based on status information and/or historical data). If such an entry is found, that entry can be replaced with the information associated with the close friend.

Yet another aspect of the disclosed subject matter relates to a method that can be employed to facilitate dynamic and/or automatic provisioning of an access control list in a FAP. The method comprises analyzing access data and determining identities, for example, of a UE to which femto network access is likely to be granted. Moreover, a friends list can be populated with the identities and an access priority associated with each identity in the friends list can be determined. Further, the access control list can be populated automatically and/or dynamically, with identities from the friends list that have the highest priority.

The following description and the annexed drawings set forth certain illustrative aspects of the specification. These aspects are indicative, however, of but a few of the various ways in which the principles of the specification may be employed. Other advantages and novel features of the specification will become apparent from the following detailed description of the specification when considered in conjunction with the drawings.

BRIEF DESCRIPTION OF THE DRAWINGS

FIG. 3 illustrates an example data structure for friends list that can be employed to facilitate femtocell access provisioning.

DETAILED DESCRIPTION

Figure 1:
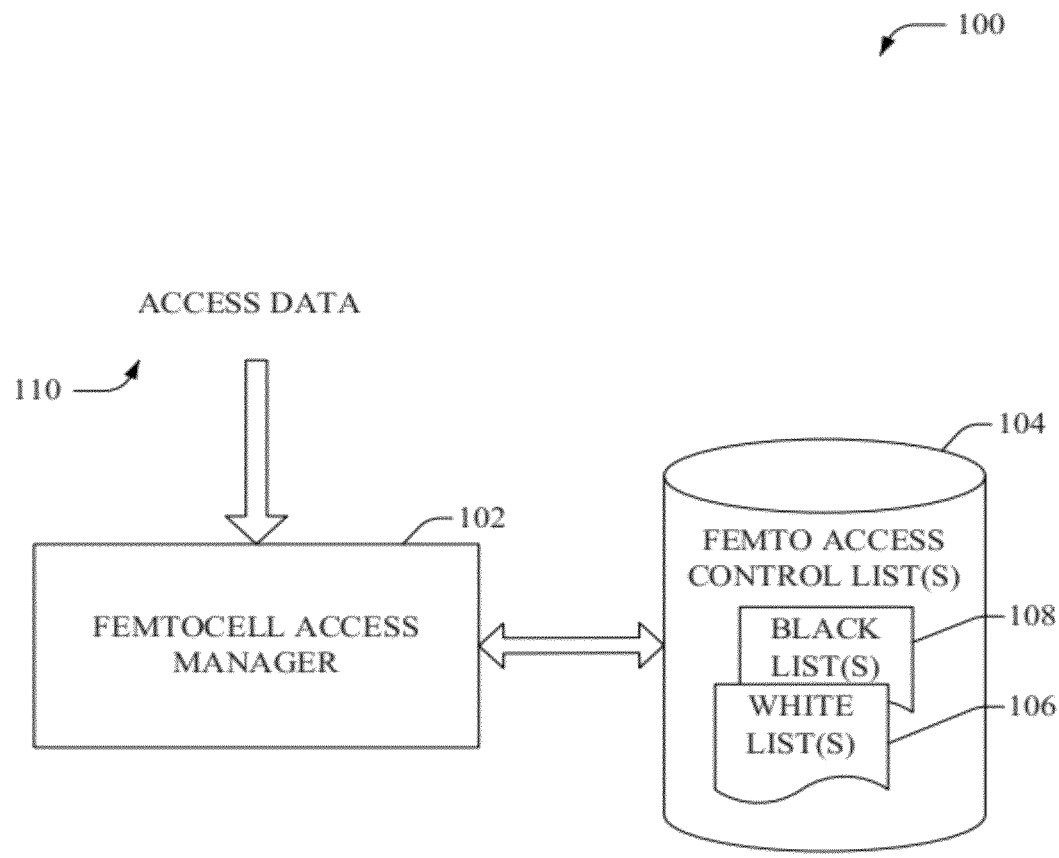
FIG. 1 illustrates an example system that can automatically provide and/or manage access to a femto network.

One or more embodiments are now described with reference to the drawings, wherein like reference numerals are used to refer to like elements throughout. In the following description, for purposes of explanation, numerous specific details are set forth in order to provide a thorough understanding of the various embodiments. It may be evident, however, that the various embodiments can be practiced without these specific details, e.g., without applying to any particular networked environment or standard. In other instances, well-known structures and devices are shown in block diagram form in order to facilitate describing the embodiments in additional detail.

As used in this application, the terms "component," "module," "system," "interface," "platform," "service," "framework," "manager," or the like are generally intended to refer to a computer-related entity, either hardware, a combination of hardware and software, software, or software in execution or an entity related to an operational machine with one or more specific functionalities. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers. As another example, an interface can include I/O components as well as associated processor, application, and/or API components.

Further, the various embodiments can be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications can be made to this configuration without departing from the scope or spirit of the various embodiments.

In addition, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms like "user equipment," "mobile station," "mobile," subscriber station," "access terminal," "terminal," "handset," "mobile device," and similar terminology, refer to a wireless device utilized by a subscriber or user of a wireless communication service to receive or convey data, control, voice, video, sound, gaming, or substantially any data-stream or signaling-stream. The foregoing terms are utilized interchangeably in the subject specification and related drawings. Likewise, the terms "access point," "base station," "Node B," "evolved Node B," "home Node B (HNB)," and the like, are utilized interchangeably in the subject application, and refer to a wireless network component or appliance that serves and receives data, control, voice, video, sound, gaming, or substantially any data-stream or signaling-stream from a set of subscriber stations. Data and signaling streams can be packetized or frame-based flows. Additionally, the terms "femtocell", and "femto" are utilized interchangeably, while "macro cell" and "macro" are utilized interchangeably herein. Similarly, the terms "femtocell access point", "femtocell" and "femto access point" are also utilized interchangeably.

Further, the terms "user," "subscriber," "customer," and the like are employed interchangeably throughout the subject specification, unless context warrants particular distinction(s) among the terms. Furthermore, the terms "owner," "authorized user," and the like refer to an entity authorized to modify/update/create/delete femto access control list(s) in the femto access point and/or an entity about which data (e.g., social network data) can be collected to facilitate femtocell provisioning. These terms are employed interchangeably throughout the subject disclosure. It should be appreciated that the aforementioned terms can refer to human entities or automated components supported through artificial intelligence (e.g., a capacity to make inference based on complex mathematical formalisms), which can provide simulated vision, sound recognition and so forth. In addition, the term friend, as disclosed herein refers to an entity, such as, but not limited to, a human entity, an automated component, and/or a user equipment associated with the human entity and/or automated component.

Conventional systems enable a femtocell user to grant femtocell usage access to a limited number of persons (e.g., friends and family) by provisioning identity information in an access list within the femto access point (FAP). However, populating the access list can be tedious for users, and the limited length access list (e.g., typically limited to ten entries) fails to meet user requirements. The systems and methods disclosed herein provide user friendly, automatic, and dynamic femtocell access provisioning based on social network, presence (e.g., location and/or status data), and user preference information.

Aspects, features, or advantages of the subject innovation can be exploited in substantially any wireless communication technology; e.g., Wi-Fi, Worldwide Interoperability for Microwave Access (WiMAX), Enhanced General Packet Radio Service (Enhanced GPRS), Third Generation Partnership Project (3GPP) Long Term Evolution (LTE), Third Generation Partnership Project 2 (3GPP2) Ultra Mobile Broadband (UMB), High Speed Packet Access (HSPA), or Zigbee. Additionally, substantially all aspects of the subject innovation can be exploited in legacy telecommunication technologies.

Referring initially to FIG. 1, there illustrated is an example system 100 that can automatically provide and/or manage access to a femto network, according to an aspect of the subject innovation. In one aspect, a femtocell access manager 102 is utilized to automatically and/or dynamically provision the femto access control list(s) 104. Typically, the femto access control list(s) 104 is stored, for example, in memory, within the femto access point (FAP) (not shown) and can include a white list(s) 106 and/or a black list(s) 108. However, the white list(s) 106 and/or black list(s) 108 can grant/deny femtocell usage access to a limited number of user equipment (UEs).

According to an embodiment, the femtocell access manager 102 can provide a user friendly and effective process for provisioning the femto access control list 104. It can be appreciated that the femtocell access manager 102 can reside within the FAP, the access network (e.g., femtocell or gateway), the UE (e.g., cell phone, PC, laptop, netbook, etc.), and/or can be located in the service provider's core network (e.g., one or more IP multimedia subsystem (IMS) based application servers). In one aspect, the femtocell access manager 102 can facilitate static and/or dynamic provisioning of the femto access control list 104. During static provisioning, the femtocell access manager 102 can analyze access data 110 to automatically populate the white list(s) 106 and/or black list(s) 108. Moreover, the access data 110 can include, but is not limited to, data from social network(s), address book(s), communication log(s), calendar(s), user preference(s), historical data, presence and/or location data, etc.

In one aspect, the femtocell access manager 102 can identify a list of identities (e.g., persons, devices, etc.), based in part on the analysis of the access data 110 and can populate a friends list (not shown) with the identities. Typically, the friends list can be most any relational database table that includes a set of one or more fields for each attribute in the tables. It is noted, however, that other table models (e.g., hierarchical, object oriented) can be employed to define the friends list. Moreover, the friends list can include N entries, wherein N can be most any natural number from 1 to infinity. For example, the friends list can be substantially larger and include a greater number of entries than the limited-length femto access control list(s) 104 in the FAP. In addition, the femtocell access manager 102 can automatically populate the femto access control list 104, without user intervention, based on the entries in the friends list and/or analysis of the access data 110. In another aspect, the femtocell access manager 102 can automatically re-provision the femto access control list 104 dynamically, to grant/deny access to appropriate UEs. Moreover, the femtocell access manager 102 can identify one or more entries in the femto access control list 104, which can be replaced with new identities from the friends list. In particular, the provisioning, by the femto access manager 102, can be initiated automatically and/or on user demand.

In an example scenario, an authorized user can run a Femtocell Access Manager Program that initiates provisioning by the femto access manager 102. The femto access manager 102 can automatically identify and provision persons/UEs for femtocell access who are (i) Close friends (e.g., likely candidates for being granted access by the user); and/or (ii) Likely to visit (e.g., likely candidates for using the user's femtocell). It can be appreciated that the terms "close friend" and "friend" disclosed herein, can include, but is not limited to most any entity (e.g., person, UE), to which the user is likely to grant femtocell usage access. In one aspect, the femto access manager 102 can identify 'close friends' based on the access data 110 that can include, but is not limited to information from the user's Social Network(s), (e.g., Facebook, MySpace, LinkedIn, etc.), Address Books (e.g., contact lists from the user's Phone, computer, laptop etc. and/or email application), websites/blogs, and/or Communications logs (e.g., from the user's telecommunications service provider, from the user's web based history and/or cell phone history, etc.).

In addition, the femto access manager 102 can also identify which of the close friends are likely to visit the femtocell coverage area. Accordingly, the identified list of close friends list can be further refined with knowledge of which friends are likely to visit the user. For example, the femto access manager 102 can analyze data such as, but not limited to, presence and/or location information, and/or historical data, within the access data 110. Such data can be derived from friends' addresses (e.g., from service provider records, social network information), and/or location information (e.g., presence, geolocation data) obtained from service provider records, web tracking records, cell phone mobility records (e.g., geolocation) and the like. Accordingly, the femto access manager 102 can determine a personalized list of user's close friends and which of those are likely candidates for visiting the femtocell. In one aspect, the femto access manager 102 can provide the user with suggestions for provisioning the femto access control list 104 and/or can automatically provision the femto access control list 104, without user intervention.

In particular, the femto access manager 102 can receive the phone numbers (e.g., the MSISDN) of the close friends from service provider records, social network records, and/or input from the user. Moreover, a privacy component (not shown) can be utilized to provide customers (e.g., the user and/or the close friends) control over how their personal information is collected, shared, and/or used.

As noted above, the femto access control list 104, typically, allows for only a limited number of entries (e.g., 10), which is typically insufficient to accommodate all the entities, to which the user would like to grant access. Accordingly, the femto access manager 102 can dynamically displace one or more entries in the femto access control list 104 to accommodate the new entities. In one aspect, the femto access manager 102 can analyze the presence information associated with the close friends in the friends list. For example, presence information can include, but is not limited to, location data that is employed to determine if a friend is 'At Home' (e.g. within the femtocell coverage area), and/or availability status that is employed to determine willingness to communicate (e.g., Sleeping, Do Not Disturb, etc). In addition, the femto access manager 102 can utilize user preferences for granting access priority to select which of the close friends should be granted access when the number of close friends present and available exceeds the length of the femtocell access control list 104. Access priority values for the close friends can be determined by the user manually, or default recommendations can be provided, for example, by the femto access manager 102, based in part on social network information (e.g. how 'close' the friend is, which can be determined based on social metrics and/or relationship strengths). Further, close friends that are visiting can be scheduled access based on calendar information. Moreover, the femto access manager 102 can automatically provision the femto access control list 104 to provide service to the highest priority family and friends who are 'At Home' and 'Available'.

It can be appreciated that although the above example scenario includes a home setup, the system 100 can be utilized in most any scenario wherein a femtocell is deployed. For example, system 100 can be utilized in a hotel, office, restaurant, warehouse, salon, hospital, factory, apartment complex, airport, health club, etc. Moreover, access data 110 can include online or offline transaction(s) related to commerce (e.g., hotel reservation, airfare purchases); social networking; content dissemination (e.g., blogs, chat rooms); scheduling services (e.g., meeting organizing, appointment(s) in medical clinic, appointment(s) in hair salon); or the like.

Figure 2:
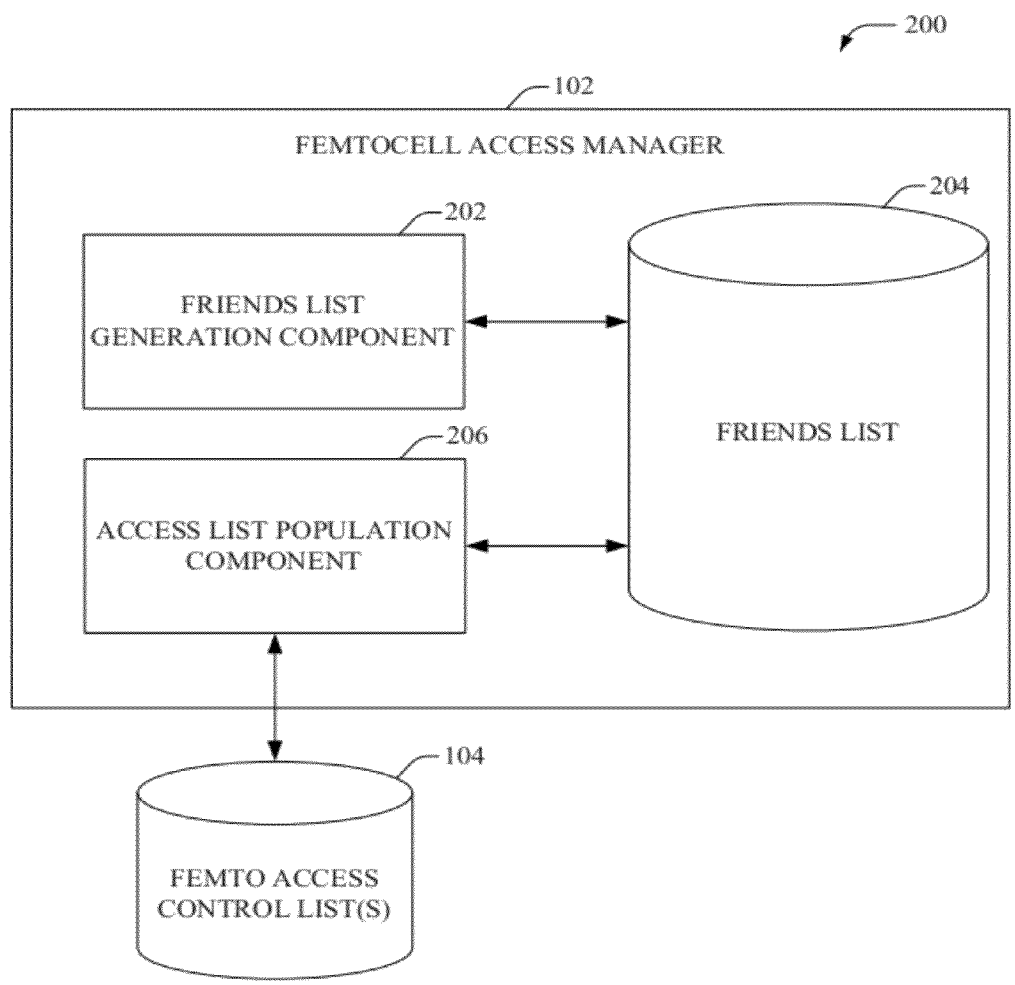
FIG. 2 illustrates an example system that can be employed for automatically and/or dynamically populating a femto access control list.

Referring to FIG. 2, there illustrated is an example system 200 that can be employed for automatically and/or dynamically populating a femto access control list 104 in accordance with an aspect of the subject disclosure. Typically, the femto access manager 102 can reside within a FAP, and/or be operatively connected to the FAP. It can be appreciated that the femto access manager 102 and femto access control list 104 can include functionality, as more fully described herein, for example, with regard to system 100.

According to an embodiment, the femto access manager 102 can include a friends list generation component 202 that facilitates population of the friends list 204. Although the friends list 204 is illustrated within the femto access manager 102, it can be appreciated that friends list 204 can be external to the femto access manager 102 and operatively connected to the femto access manager 102. Moreover, the friends list generation component 202 can receive access data (e.g., access data 110), such as but not limited to, social networking information, communication logs, calendar data, address book data, information from websites and/or blogs, transaction related data, and the like. Based in part on an analysis of the received access data, the friends list generation component 202 can identify 'close friends' associated with the authorized user and populate the friends list 204 with the identified 'close friends'.

As an example, the friends list 204 can include a list of UEs (e.g., UEs belonging to family and friends, clients, patients, customers, etc.) to which the user is likely to grant femtocell access. In addition, the friends list 204 can include information associated with populating the femto access control list 104. Further, the friend list 204 can include a priority such that UEs with higher priority are granted preferred access over UEs with lower priority. In one aspect, the friends list generation component 202 can assign priority values to each entry within the friends list 204 based on an analysis of the received data and can sort the entries in the friends list 204 in ascending or descending order of priority. Additionally or alternately, priority can be determined based on a category, such that, all members of a given category can be assigned a given priority. For example, the authorized user can define categories, priority of categories, and membership in categories, and/or categories can be automatically defined (e.g., by default) based on social relationships (e.g., church members, colleagues, family, sports team, regular customers, etc.). In one aspect, combinations of categories, priority within categories, and individual priorities can be applied.

Further, priority can be dynamically changed and/or updated by the friends list generation component 202. As an example, a temporary visitor (e.g., a relative on vacation) or employee (e.g., a babysitter) who is visiting a location served by the FAP for a limited period of time, can be assigned a higher priority during the specific period of time. In one example, priorities can be explicitly assigned by the user and/or automatically determined priorities (e.g., by the friends list generation component 202) can be confirmed and/or modified by the user. Typically, priority can automatically be provided as a function of the nature of the authorized user's social relationship with the close friend, which can be determined from social utility grid. Moreover, the social utility grid can be employed to quantify social relationships of the user and can be employed to determine a strength for each relationship to facilitate ranking and/or priority.

Further, the femto access manager 102 can include an access list population component 206 that can dynamically update and/or modify the entries in the femto access control list 104. In one aspect, the access list population component 206 employs data from the friends list 204 and populates the femto access control list 104 with the highest priority entries in the friends list 204. The access list population component 206 can provision the femto access control list 104 taking into consideration access priority, location, and availability. As an example, the access list population component 206 can populate the femto access control list 104 with the first 'X' highest priority 'At Home', available users in the friends list 204, wherein 'X' can be the maximum number of entries that can be accommodated within the femto access control list 104 (e.g., 10 entries).

Furthermore, the access list population component 206 can update the entries within the femto access control list 104, for example, periodically (e.g., 2 am every morning), at a predefined time, on demand, and/or when a change is made to the friends list 204. In one example, the femto access control list 104 can compare the entries of the femto access control list 104 to the 'X' highest priority entries within the friends list 204. If the lists do not match an update is performed, wherein the femto access control list is modified to include 'X' highest priority entries from the friends list 204. It can be appreciated that the access list population component 206 can utilize most any synchronization techniques to ensure timely updates to the femto access control list 104. In one example, the access list population component 206 can update and/or modify the femto access control list 104 if a change of a friend's location is detected, for example, into range of femtocell or outside range of femtocell. In another example, the access list population component 206 can update and/or modify the femto access control list 104 based on a calendar timer, for example, a periodic and/or one-time scheduled event. Additionally, the access list population component 206 can receive user input to trigger synchronization of the femto access control list 104 with the 'X' highest priority entries of the friends list 204.

The following example pseudocode provides a high level logical description of methods that may be employed by the system 200 to implement the functionality described above. It is to be noted that variations and extensions of the example pseudocode are possible, for example, depending on the language used, and are within the scope of the subject innovation.

Add Friend to Femtocell Friends List: Note: this method can be invoked by the user to manually add a friend to the friends list 204:
  Get Friend Information (Name, Phone #, Priority)
  Get Friend Presence info (location, status)
  Update Femtocell Friends List Social Network based Femtocell Friends List Update: Note: this method can be periodically automatically invoked by the Femtocell Access Manager 102, or may be manually invoked by the user:
  For each friend in <<Address Book, Social Network>>
  IF new friend found
  AND new friend not in Femtocell Friends List
  THEN Confirm addition to Femtocell Friends List
    IF Verified
      THEN Get Friend Information (Name, Phone #, Priority)
      Get Friend Presence info (location, status)
      Update Femtocell Friends List Location Based Femtocell Access List Provisioning: Note: this method detects when a friend comes into range of the user's femtocell, and then automatically updates the femtocell access control list 104 to provide the user with access. This method can be periodically invoked by the Femtocell Access Manager 102 to scan for users coming into range of the femtocell:
  FOR each friend on the Femtocell Friends List
  IF Friend not on Femtocell Control Access List
  AND Friend's Location within Femtocell Range
  AND Entry Available in Femtocell Control Access List
  THEN Provision Femtocell Access Control List (friend's MSISDN)

Cell Phone Registration: Note: this method can be invoked when a UE registers on a femtocell and the presence/location based methods have not already added the user's friend to the femtocell access control list 104. This can occur if the user's friends location hasn't been known:
  IF identity not on femtocell access control list
  AND position available in femtocell access control list
  THEN Update Femtocell Access control List (friend's MSISDN)

Referring back to FIG. 2, it can be appreciated that the femto access control list 104 and friends list 204 can include volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable PROM (EEPROM), or flash memory. Volatile memory can include random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The memory (e.g., data stores, databases) of the subject systems and methods is intended to comprise, without being limited to, these and any other suitable types of memory.

Referring now to FIG. 3, there illustrated is an example data structure 300 for friends list (204) that can be employed to facilitate femtocell access provisioning, according to an aspect of the subject disclosure. According to an aspect, the femtocell friends list (204) can include at a minimum, the information needed to populate the femtocell access control list (104). The key identifier for the femtocell access control list (104) is the friend's cell phone number, e.g., mobile subscriber number integrated digital services network number (MSISDN). In addition to the MSISDN (or international mobile subscriber identity (IMSI) number), the femtocell friends list (204) can include the logically related information that can be utilized by the femtocell access manager (102) for the functions disclosed herein. The information can include, but is not limited to, Name of Friend, Access Priority, Presence Information, for example, Location and/or Status (availability).

The example data structure 300 can includes multiple access field attributes: Name and/or deviceID (302), which uniquely identifies a device; access priority (304) that indicates the priority of the device; MSISDN (306) that provides the MSISDN for the device (or IMSI number); location (308) that provides a current location, for example, if the device is within femto coverage area or not; and/or status (310) that provides a current status for the device (e.g., busy, do no disturb, sleeping, etc.). As seen from the FIG. 3, the length of the friends list (204) can be T (any natural number), which can be substantially greater than the femto access control list (104). Further, it can be appreciated that although five access field attributes are illustrated and described herein, most any number of access field attributes can be employed to store data associated with the devices that can facilitate femtocell access provisioning.

Figure 4:
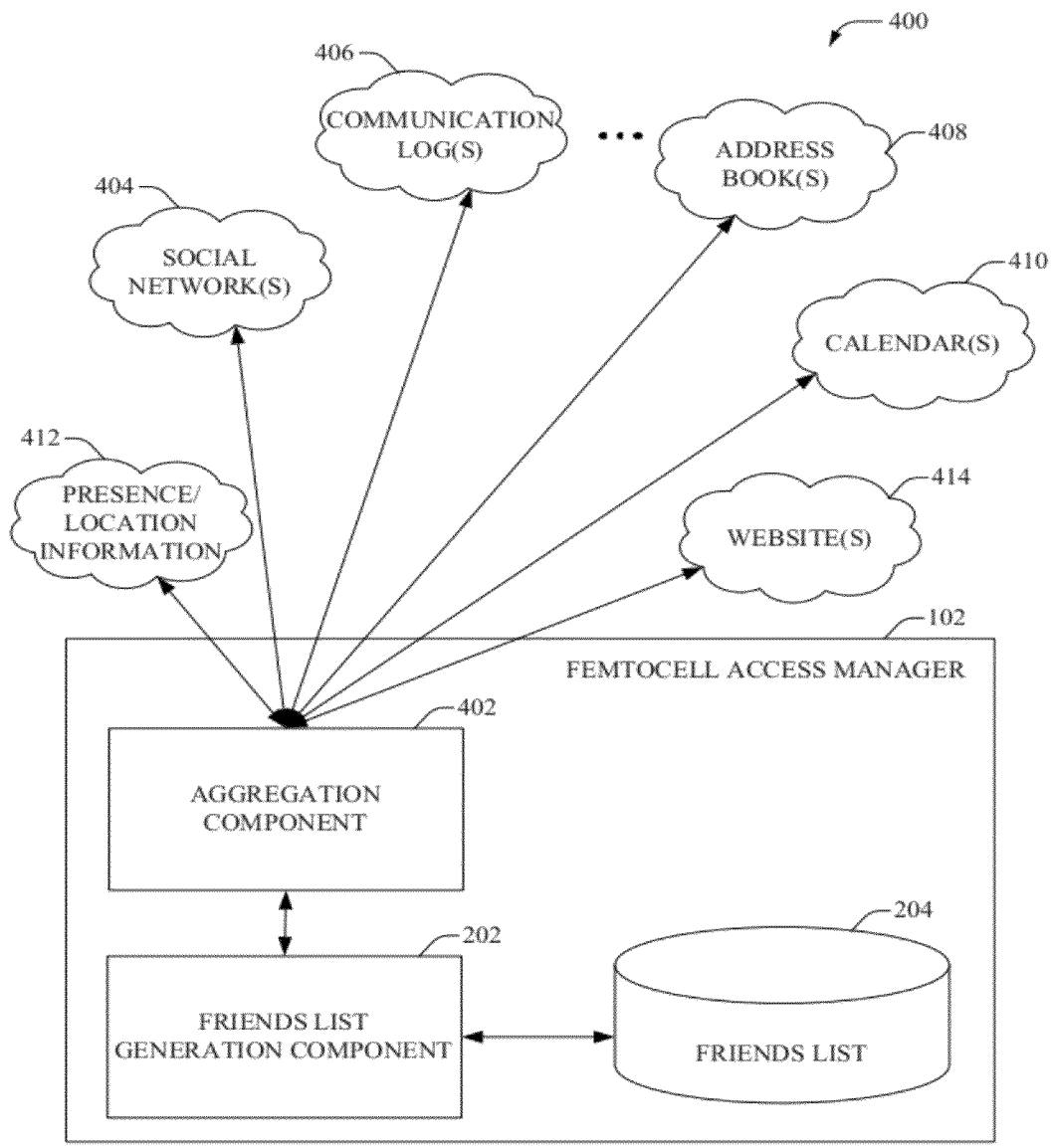
FIG. 4 illustrates an example system for collecting access data to automatically provision a femto access point (FAP).

FIG. 4 illustrates an example system 400 for collecting access data to automatically provision a FAP, according to an aspect of the subject specification. It can be appreciated that the femtocell access manager 102, friends list generation component 202 and friends list 204 can include functionality, as more fully described herein, for example, with regard to system 100 and 200. In one aspect, an aggregation component 402 can be employed to collect access data from various sources. The access data is most any data that can be utilized by the femtocell access manager 102 to provision the FAP.

According to an aspect, aggregation component 402 can extract data from one or more social networks 404 associated with the user. For example, a friend/connection/contact list can be received from a social network 404, e.g., Facebook©, Myspace©, Orkut©, LinkedIn© etc. along with UE numbers (e.g., MSISDNs, IMSIs, etc.) associated with each friend/connection/contact. Additionally or optionally, social relationships can also be extracted from the social network 404. For example, categories, profiles and/or groups to which the friend/connection/contact belongs can be identified. The categories, profiles and/or groups can include, but are not limited to, high school friends, alumni network, co-workers, gym buddies, bridge club, book of the month club, family, limited profile, fans, favorites, etc. In one example, the categories, profiles and/or groups can facilitate ranking of 'close friends' associated with a user in the friends list 204. Further, additional data, such as, but not limited to event information can also be received from the social networks 404. For example, if the user has created an event (e.g., hosted a party) at the location of the femtocell, contact information (e.g., MSISDNs, IMSIs, etc.) associated with friends that have accepted the invite can be retrieved.

Furthermore, aggregation component 402 can retrieve communications logs 406, for example, from the user's telecommunications service provider, from the user's web based history, and/or from the user's cell phone history to identify close friends and/or priority data. In addition, contacts from an address book 408, for example, from a cell phone, UE, email client, etc. can also be collected by the aggregation component 402. The contact can include a name and/or a unique number (e.g., MSISDNs, IMSIs, etc.) associated with the contact. Additionally or alternately, aggregation component 402 can receive information from a calendar 410 associated with the user, which can be located on a UE and/or online. For example, the information can include periodic events and/or non-recurring events. In one example, if a friend has a regularly scheduled visit, e.g., Monday night football, book club, gaming night, etc.; then the femtocell access manager 102 can automatically provision (and/or de-provision) the femto access control list 104 based on the periodic event. In another example, if the user is expecting a family member to visit during the holidays, the femtocell access manager 102 can allow the family member access during the time of the visit.

The aggregation component 402 can obtain presence information 412, for example, service provider records, web tracking records, cell phone mobility records (e.g., geolocation), etc. Moreover, presence information 412 can include location 412 of friends on the friends list 204, which can be monitored by the aggregation component 402. In one example, aggregation component 402 can receive a current location of a friend and/or an indication that a friend is within a certain distance of the femtocell. If the friend is within a certain distance of the femtocell, and currently not on the femto access control list 104, then the femtocell access manager 102 can provision the femto access control list 104 to grant access to the friend, considering priority information. In one example, most any presence 'watching' mechanisms can be employed to provide the monitoring functionality (e.g., social networking, location based services). According to an aspect, using system knowledge, predictive femtocell access provisioning can be enabled. For example, if the friend's position is outside the radio range of the femtocell, but it is likely the friend may be approaching the femtocell, then the friend can be provisioned on the femtocell (e.g., by the femto access manager 102), prior to coming within range of the femtocell. The likelihood that the user enters the range of the femtocell if nearby, can be determined based on historical information, directional information, speed information, and/or a machine learning technique(s).

In addition to location data, the presence information 412 can include status information, which can provide a friend's willingness to communicate (e.g., Sleeping, Do Not Disturb). In one aspect, the femtocell access manager 102 can employ the status information to facilitate provisioning of femto access control list 104. For example, if a friend within the friend list 204 has a "do not disturb" status, the friend can be given lower priority and/or removed from the femto access control list 104. Further, the femtocell access manager 102 can determine status information based on historical data and friend UE behavior. For example, the femtocell access manager 102 can determine a time period during which a friend within the femtocell coverage area does not communicate (or is not likely to communicate) and can accordingly modify priority of the friend. In accordance with one aspect, the aggregation component 402 can also collect data, identifying friends and/or unique number (e.g., MSISDNs, IMSIs, etc.) associated with the friends, from a website, for example, the user's personal website, the user's blog, or a website frequently visited by the user. Moreover, the aggregation component 402 can identify a friend name/ID and/or social relationship from the aforementioned sources and can obtain a corresponding number (e.g., the MSISDN, IMSIs, etc.) of the identified friends from service provider records, social network records, and/or input from the user.

In one example scenario wherein the femtocell is deployed in an office, the aggregation component 402 can receive client information from the company website and/or meeting information from an employee's and/or company owner's calendar and accordingly facilitate provisioning the femto access control list 104 with client information for the duration for the meeting. In another example scenario, wherein the femtocell is deployed in a department store, the aggregation component 402 can obtain contact information from a mailing list (e.g., sent to loyal customers) in an email client associated with the department store.

Figure 5:
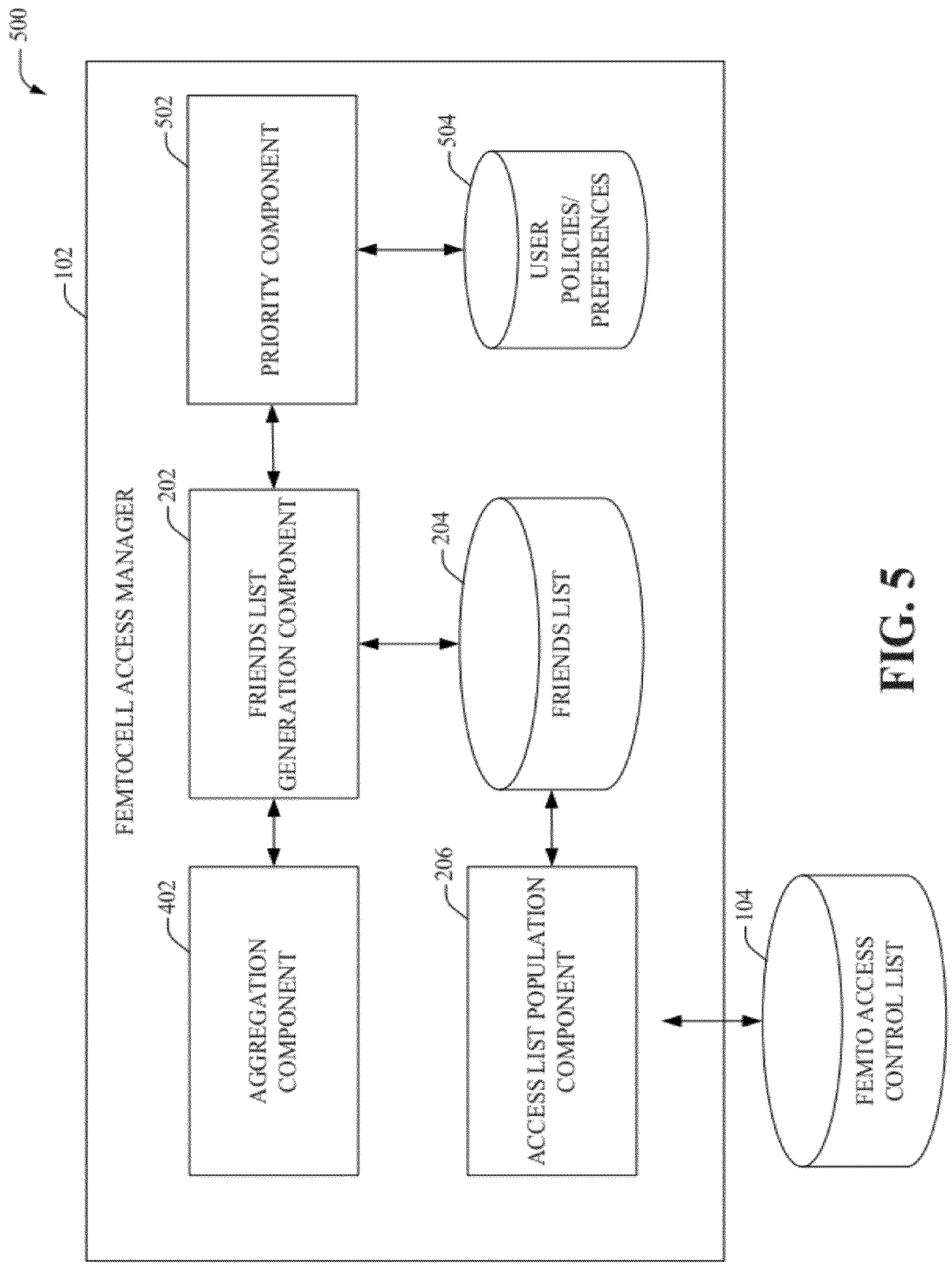
FIG. 5 illustrates an example system that facilitates automatic and dynamic femtocell access provisioning based on social network, presence, and/or user preference information.

Referring to FIG. 5, there illustrated is an example system 500 that facilitates automatic and dynamic femtocell access provisioning based on social network, presence, and/or user preference information, in accordance with an aspect of the subject disclosure. According to an aspect, femto access manager 102 can be located within the FAP, within an application server (AS) in the service provider core network, and/or within a UE, communicating with the FAP over a local area network (LAN) or the Internet. As an example, if the femto access manager 102 is located in the AS, access to presence information of friends based on their cell phone locations, and/or access to other service provider information (e.g., a core network based address book for friends) can be easier and/or faster. It can be appreciated that the femto access manager 102, femto access control list 104, friends list generation component 202, friends list 204, access list population component 206, and aggregation component 402 can include functionality, as more fully described herein, for example, with regard to systems 100, 200 and 400.

According to an aspect, the friends list generation component 202 identifies entries for the friends list 204, based in part on the access data collected by the aggregation component 402. Further, a priority component 502 is employed to calculate a priority for each entry within the friends list 204. In one example, the friends list generation component 202 can store the priority in the friends list 204 and/or sort/arrange/rank the friends list 204 based on the priority information. Moreover, friends with higher priority are granted preferred access over those with lower priority.

In one embodiment, the priority component 502 can determine priority based on various factor, such as, but not limited to, historical data, service provider policies, user policies, etc. As an example, the priority component 502 can identify priority for a friend in the friend list 204, based on a category and/or group, to which the friend belongs. In particular, the authorized user can define categories, priority of categories, and membership in categories, which can be stored in the user policies/preferences database 504. Additionally or alternately, categories can be automatically identified by the priority component 502 based on social relationships, for example, obtained from and/or determined based on an analysis of the access data. For example, categories such as, but not limited to, church members, colleagues, family, sports team, etc. and be defined and a priority for members of each category can be defined (e.g., by the priority component 502). In accordance with an aspect, priority component 502 can also set and/or modify priority based on the type of call/communication. For example, an emergency call can be provided with highest priority. In addition, the priority component 502 can receive explicit priority assignments for friends from the user.

Further, the priority component 502 can enable the user, for example, via the user policies/preferences 504 to guarantee access by assigning the highest priority to certain entities. For example, the user can assign family members, living in the home wherein the femtocell is deployed, the highest positions in the priority list. Additionally, it can be possible to provide certain users with a 'locked in' priority such that even if they are not present within the femtocell coverage area, their position in femto access control list 104 is not available for usage by other friends. For example, the user's son can be frequently in and out of the house and can have high priority for femtocell access. While the user's bridge club is meeting at the house, the femto access control list 104 can constantly be updated as he moves in and out of femtocell range, such that he is granted priority over other friends (e.g., in the bridge club). This example scenario can be disruptive to the user experience of the other friends in the bridge club. By 'locking in' his position on the femto access control list 104, the disruptive service to other friends can be avoided. Alternatively, if the user values provision of service to the bridge club friends over that of the son, but only while the club is meeting, the user can provide the club members with a higher priority access during the time of the meeting (e.g., as a calendar event). Moreover, the user policies/preferences 504 can store priority rankings associated with groups or individuals, as defined by the user, which can facilitate femto access provisioning. The above example user input can be stored within user policies/preferences database 504. It can be appreciated that most any user defined policies/preferences can be employed and that the subject specification is not so limited.

Moreover, the user policies/preferences 504 can specify access to provisioned femto service(s), e.g., full access for a specific time interval such as days (e.g., a relative is on vacation in a house with a provisioned FAP) or hours (e.g., babysitter is on duty for specific hours), or (ii) temporary restricted access, which can determine access to selected services only within a window of time in a day (e.g., voice and data allowed from 9:00 a-6:00 p, or voice allowed after 9:00 p which can facilitate billing schemes already established by an operator/service provider), etc. Further, the user policies/ preferences 504 can define various factors associated with femtocell usage, such as, but not limited to, amount of usage time allowed, type of communication allowed, amount of usage allowed, etc., that facilitate identification of a priority (e.g., by the priority component 502). Furthermore, the user policies/preferences 504 can specify parental controls and/or most any other restrictions on femtocell access and/or provisioning.

In one example, the user policies/preferences 504 can be utilized by the priority component 502 to select which friends can be granted access when the number of friends present and available in the friends list 204 exceeds the length of the femto access control list 104. The access list population component 206 can determine whether an entry in the femto access control list 104 is available, for example, if there are entries in the femto access control list 104 that are not used, if an occupied entry in the femto access control list 104 is occupied by a friend with a lower priority than the friend being considered from the friend list 204, and/or if an occupied entry in the femto access control list 104 is occupied by a friend with a higher priority than the friend being considered, but the higher priority friend is outside the femtocell coverage area (e.g., the higher priority friend is not registered on the femtocell, or is not within the geographic proximity of the femtocell). In addition, when a friend's cell phone (or UE) attempts registration on the femtocell, the femtocell access manager 102 can be notified. The femtocell access manager 102 can determine whether the friend is currently on the femto access control list 104. If the friend is not on the femto access control list 104, but can be accommodated by the femtocell access manager 102, the femtocell access manager 102 can dynamically and/or automatically provision the femto access control list 104 to grant access.

Figure 6:
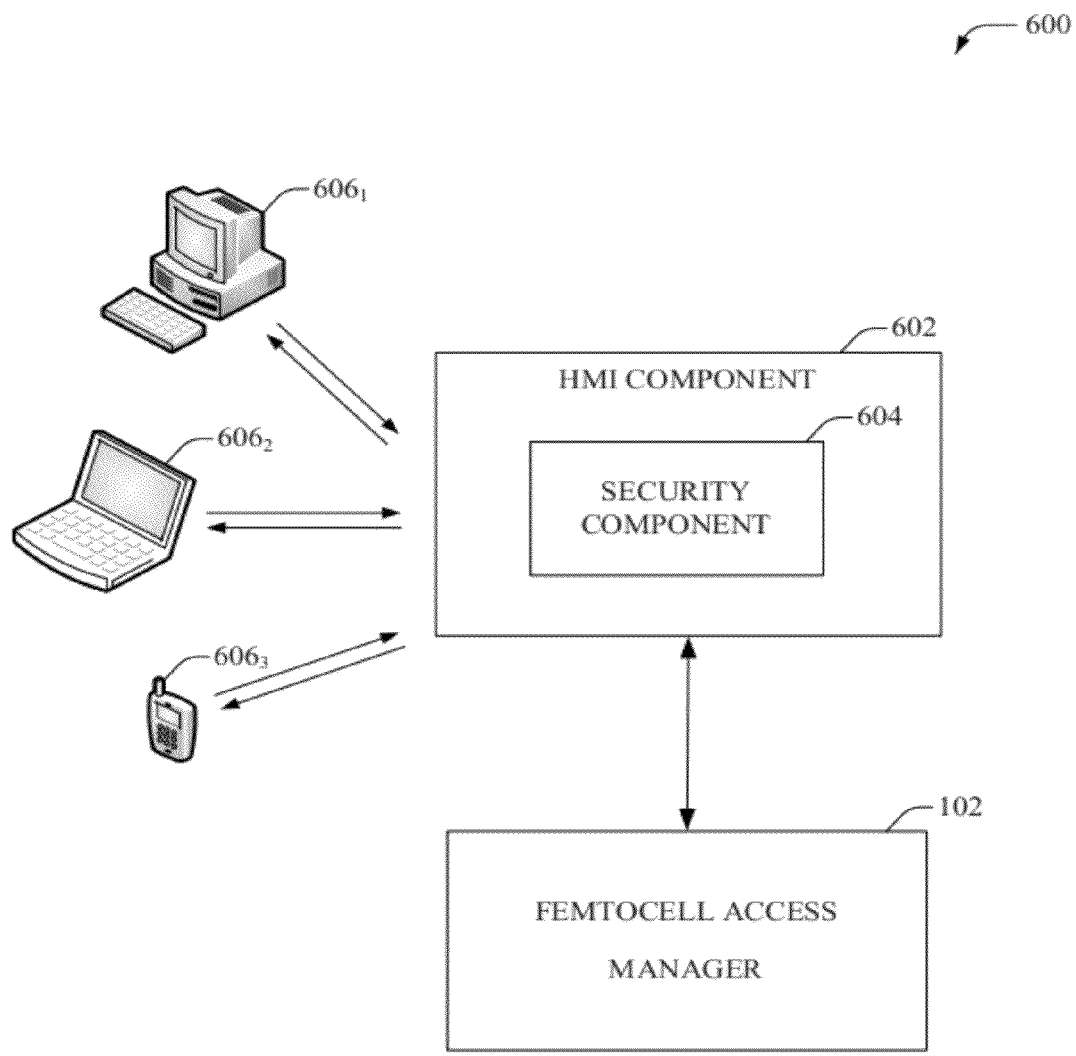
FIG. 6 illustrates an example system that provides a user interface to a femtocell access manager.

FIG. 6 illustrates an example system 600 that provides a user interface to a femtocell access manager 102, according to an aspect of the subject disclosure. In one aspect, the Human machine interface (HMI) component 602 can provide an authorized user with access to the femtocell access manager 102. Although the HMI component 602 is shown outside the femtocell access manager 102, it can be appreciated that the subject innovation is not so limited and that the HMI component 602 can reside within the femtocell access manager 102. In addition, a security component 604 can be utilized to facilitate authentication of users accessing the femto access manager 102. For example, most any authorization and/or authentication mechanism can be utilized and access privileges can be set at a granular level.

According to an aspect, a user can communicate with the HMI component 602 via a UE 606, over most any wired and/or wireless communication. Typically, the UE 606 as disclosed herein can include most any communication device employed by a user, such as, but not limited to, a personal computer ($606_1$), a laptop ($606_2$), a cellular phone ($6063_3$), a personal digital assistant (PDA), a media player, a gaming console, IP television, and the like. In one example, an application can be downloaded onto the UE 606 to facilitate communication. In another example, the HMI component 602 can reside within the FAP and the user can directly access the femto access manager 102 via an interface on the FAP. In addition, the HMI component 602 can also receive user input from a server in a network (e.g., a service network linked to a mobile network platform). For example, user input can be embodied in a short message service (SMS) communication, a multimedia service (MMS) communication, an email communication, instant message (IM) communication, an unstructured supplementary service data (USSD) message, or the like.

In an embodiment, a wizard can be employed by the HMI component 602 to facilitate user interaction with the femtocell access manger 102. A wizard is a user interface (e.g., GUI) that guides a user through a sequence of steps, wherein each step should be completed before advancing to the next step in the series unless the step is optional, of course. The GUI can include a plurality of related images and interface objects or elements to facilitate user manipulations to the various functions within the femto access manager 102 (e.g., the friends list 204, user policies preferences, priority component 502, etc.) and/or the femto access control list 104. For example, an interface can include any combination of, among other things, text, text boxes, drop down menus, checkboxes, and buttons which can be interacted with utilizing one or more of a pointing device (e.g., stylus, mouse, trackball, touchpad . . . ), keyword, or voice activated software.

Moreover, the wizard can be run by the user during setup, periodically, and/or at most any time. For example, when an owner, Kathy, purchases her femtocell, she can run the femtocell access manager wizard. The wizard can request for access to the relevant information resources (e.g., Kathy's social network(s), phone records, Outlook calendar, etc.) and present Kathy with a list of close friends identified by the femto access manager 102. As an example, the list can include a checklist of the 'top' (e.g., highest priority) friends in the friends list. By default, the top candidates can be 'checked' for access control list provisioning. Kathy can click a 'Yes, Grant Access' button, to provide the 'close friends' access to her femtocell.

In addition to being run when the user installs a femtocell, the wizard can be periodically run (manually invoked, event-triggered, or scheduled) to check for updates and recommend friends, or automatically provision the access control. Doing so ensures the femto access control list 104 is kept current without the user performing a cumbersome task. Further, in one example, if the femtocell access manager 102 identifies a new friend to be added to the friends list 204, the femtocell access manager 102 can present the new friend to the user via the HMI component 602 (e.g., "do you want to provide access for this new friend?"). Typically, new friends can be provided in a checklist with each checked by default. If the user unchecks a friend, then they are not added to the friends list 204. After the user confirms their addition, additional information (e.g., priority) for adding them can be acquired and the femto access control list 104 can be updated.

Further, the HMI component 602 can be utilized to receive additional data (e.g., MSISDN, IMSI, etc.) associated with close friends in the friends list 204, for example, when the additional data cannot be retrieved automatically. Furthermore, the HMI component 602 can enable a user to assign access priorities to the close friends and/or set/define user policies and/or preferences.

Figure 7:
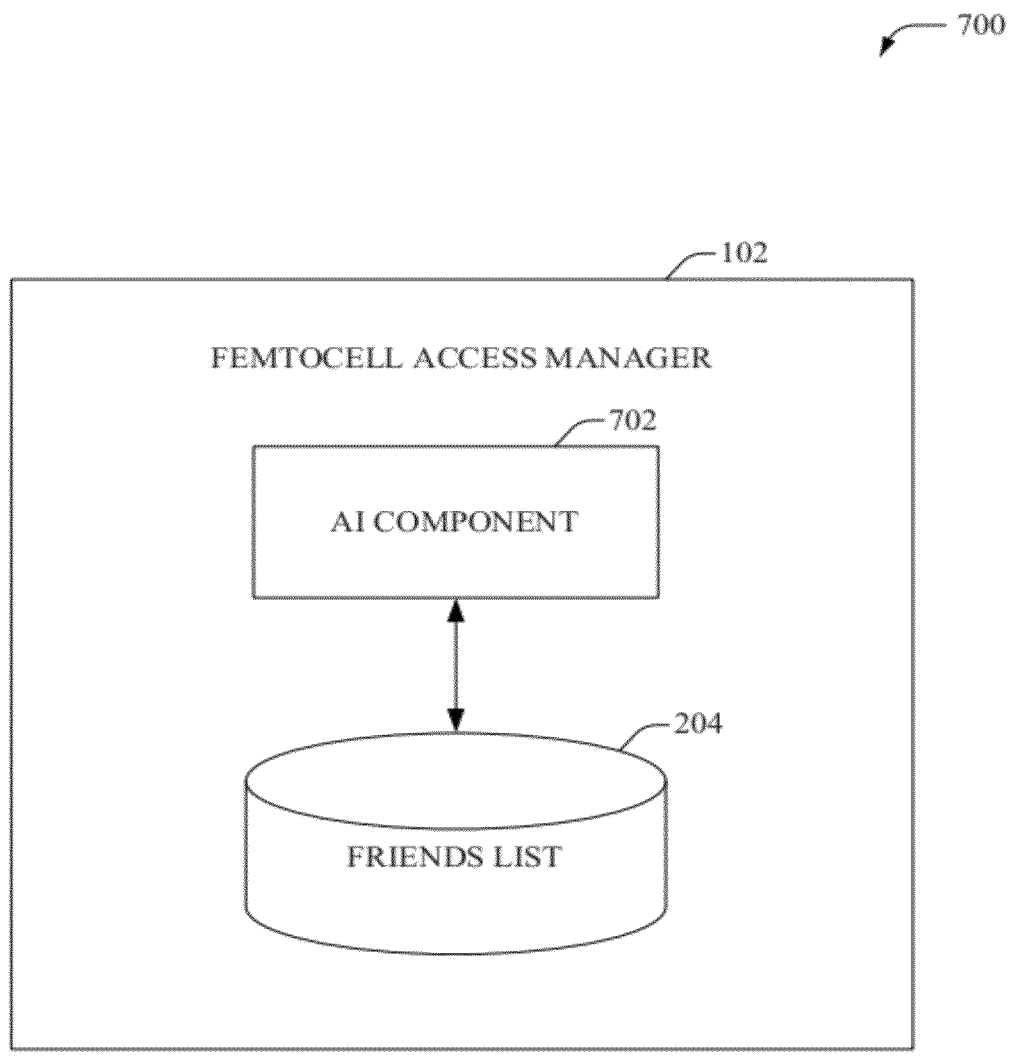
FIG. 7 illustrates an example system that facilitates automating one or more features in accordance with the subject innovation.

FIG. 7 employs an artificial intelligence (AI) component 702, which facilitates automating one or more features in accordance with the subject innovation. It can be appreciated that the femtocell access manager 102 and the friends list 204 can include respective functionality, as more fully described herein, for example, with regard to systems 100, 200, 400, and 500.

The subject innovation (e.g., in connection with friends list and/or access control list population) can employ various AI-based schemes for carrying out various aspects thereof. For example, a process for determining when or how to generate and/or modify the friends list and/or femto access control list can be facilitated via an automatic classifier system and process. Moreover, the classifier can be employed to identify close friends, determine the access priority for close friends, determine which of the close friends are to be added to the femto access control list, which entries in the femto access control list are to be replaced, etc.

A classifier is a function that maps an input attribute vector, x=(x1, x2, x3, x4, xn), to a confidence that the input belongs to a class, that is, f(x)=confidence(class). Such classification can employ a probabilistic and/or statistical-based analysis (e.g., factoring into the analysis utilities and costs) to prognose or infer an action that a user desires to be automatically performed. In the case of communication systems, for example, attributes can be access data (e.g. collected by aggregation component 402) and/or user policies preference 504 and the classes can be categories or areas of interest (e.g., levels of priorities).

A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated from the subject specification, the subject innovation can employ classifiers that are explicitly trained (e.g., via a generic training data) as well as implicitly trained (e.g., via observing UE behavior, receiving extrinsic information). For example, SVM's are configured via a learning or training phase within a classifier constructor and feature selection module. Thus, the classifier(s) can be used to automatically learn and perform a number of functions, including but not limited to determining according to a predetermined criteria when a friend in the friends list and/or femto access control list is not likely communicate, how and when to identify close friends, access priority associated with close friends, which of the close friends are to be added to the femto access control list, which entries in the femto access control list are to be replaced, etc. The criteria can include, but is not limited to, historical patterns, UE behavior, user preferences, service provider preferences and/or policies, femto AP parameters, location of the UE, motion of the UE, location of the femtocell, access data, etc.

Figure 8:
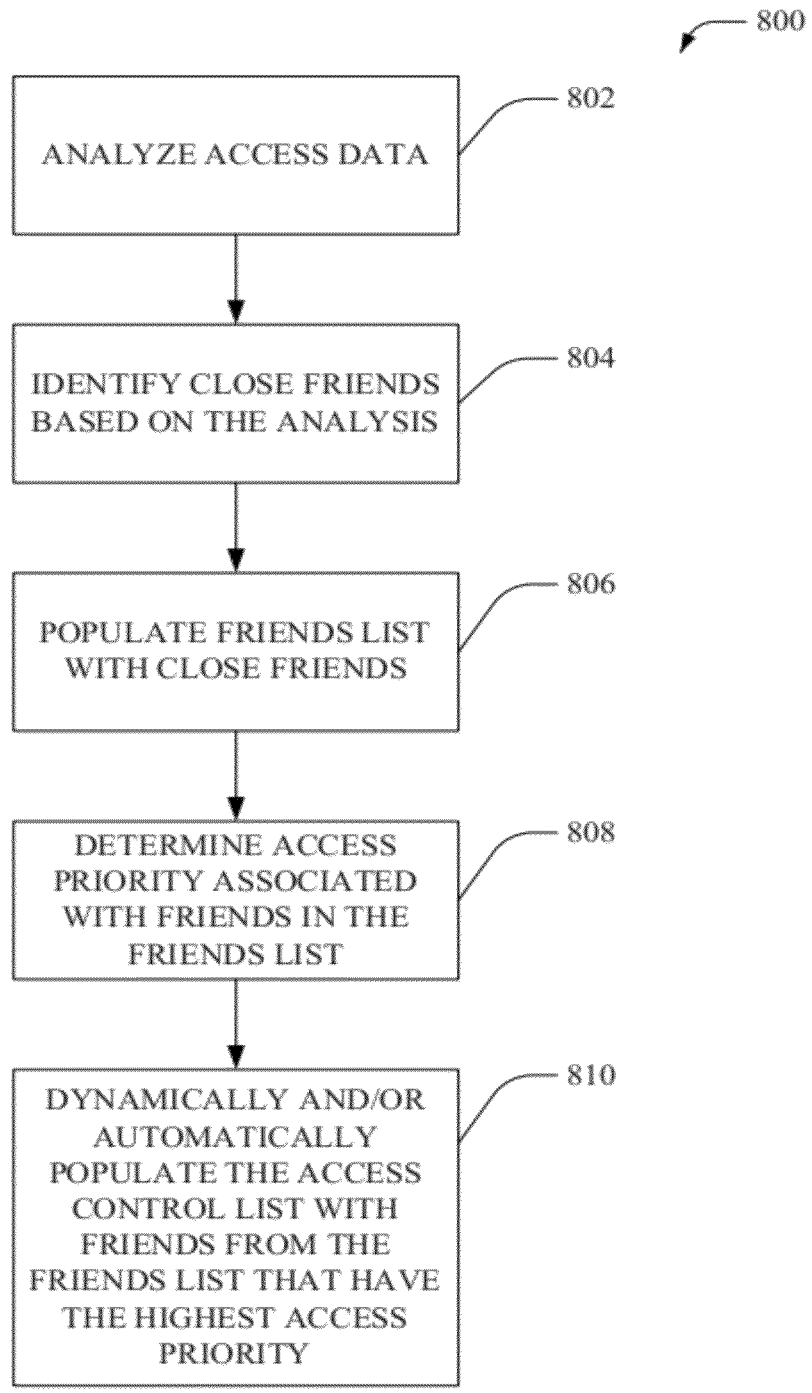
FIG. 8 illustrates an example methodology that can be utilized to facilitate dynamic and/or automatic provisioning of an access control list in a FAP.
Figure 9:
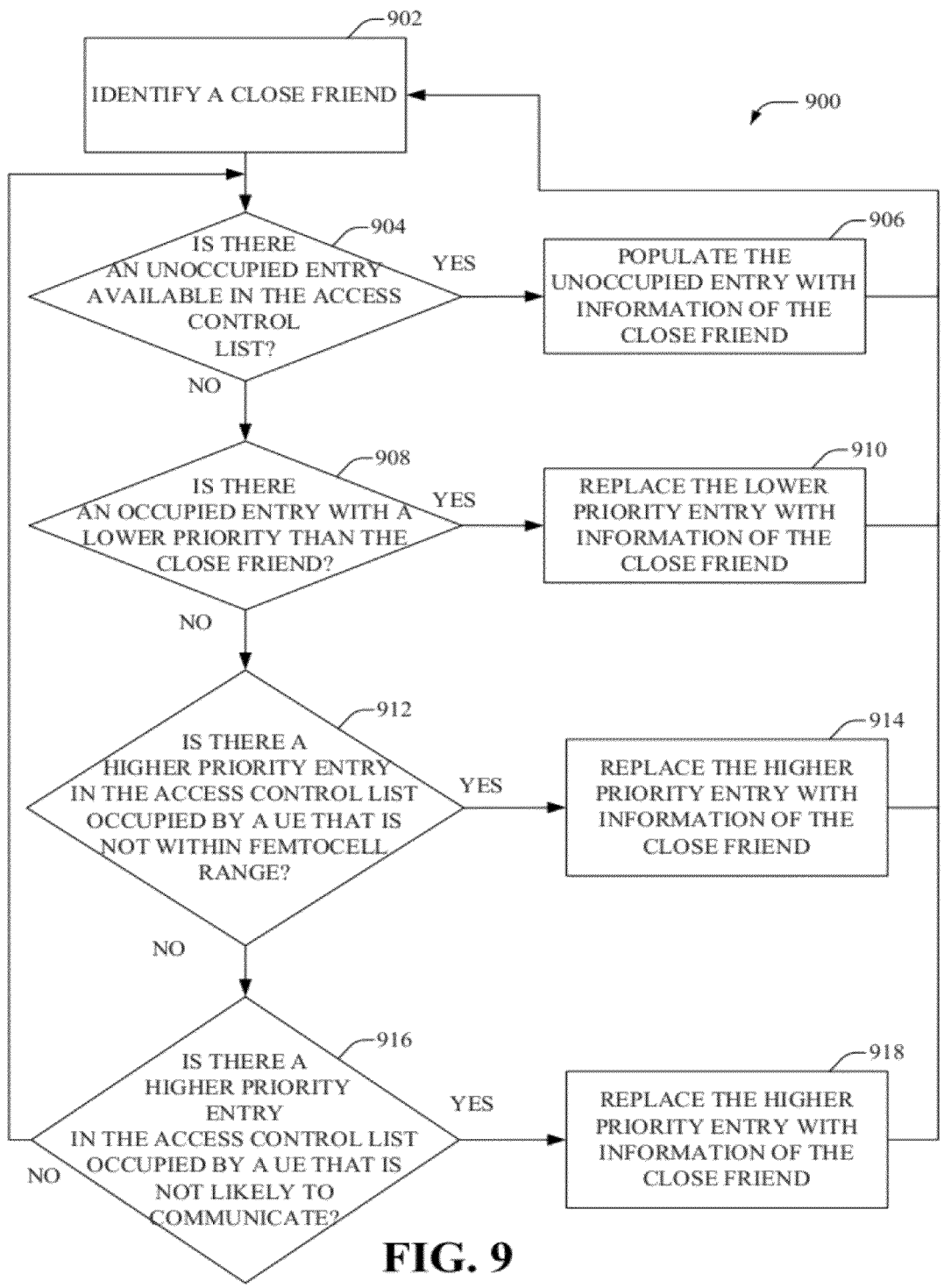
FIG. 9 illustrates an example methodology that facilitates dynamic and automatic generation and/or modification of an access control list in a FAP.

FIGS. 8-9 illustrate methodologies and/or flow diagrams in accordance with the disclosed subject matter. For simplicity of explanation, the methodologies are depicted and described as a series of acts. It is to be understood and appreciated that the subject innovation is not limited by the acts illustrated and/or by the order of acts, for example acts can occur in various orders and/or concurrently, and with other acts not presented and described herein. Furthermore, not all illustrated acts may be required to implement the methodologies in accordance with the disclosed subject matter. In addition, those skilled in the art will understand and appreciate that the methodologies could alternatively be represented as a series of interrelated states via a state diagram or events. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device, carrier, or media.

Referring now to FIG. 8, illustrated is an example methodology 800 that can be utilized to facilitate dynamic and/or automatic provisioning of an access control list in a FAP, according to an aspect of the subject innovation. Access data associated with a femtocell owner or a set of authorized users can be collected from various sources, such as but not limited to, social networks, calendars, email applications, websites, chat conversations (e.g., instant messaging), communication logs, address or contact books, presence data (e.g., location and/or availability), etc. Moreover, access data can be most any information that can facilitate dynamic and/or automatic femtocell access provisioning. As an example, the owner/set of users can be provided control of the information collected for privacy management.

At 802, the access data can be analyzed. Further, at 804, close friends can be identified based on the analysis. For example, a close friend can be most any UE/person that the owner and/or set of authorized users would be likely to grant femtocell network access. Additionally or optionally, user input can be requested to confirm whether access can be granted to the identified close friends. At 806, a friends list can be populated with the identified (and/or confirmed) close friends. Typically, the friends list is disparate from a femto access control list and can be substantially larger (e.g., in size) than the limited length femto access control list. At 808, access priority associated with each friend in the friends list can be determined. According to an aspect, access priority can be identified automatically based on an analysis of access data, location and/or status of friends, user policies/preferences and/or service provider policies/preferences. In one example, close friends in the friends list can be assigned an access priority, such as, "fixed," "very high," "high," "medium," "low," "very low" etc., or all entries in the friends list can have a unique ranking (e.g., 1 to N, wherein N is the total number of entire in the friends list). However, it can be appreciated that the subject specification is not so limited and most any priority scheme can be employed. In one aspect, the friends list can be sorted in an ascending or descending order based on the access priority.

Further, at 810, the access control list can be populated automatically and/or dynamically, with friends from the friends list that have the highest priority. For example, X friends with highest priority can be included in the access control list, wherein X is the maximum number of entries that can be stored in the access control list. Moreover, the access control list can be populated periodically, on demand, based on an event (e.g., change in friends location, presence and/or priority), etc.

FIG. 9 illustrates an example methodology 900 that facilitates dynamic and automatic generation and/or modification of an access control list in a FAP, according to an aspect of the subject disclosure. Typically, access data from various sources, such as but not limited to, social networks, calendars, email applications, websites, chat conversations (e.g., instant messaging), communication logs, address or contact books, presence data (e.g., location and/or availability),etc. can be aggregated and analyzed. At 902, a close friend can be identified, for example, based on the analysis and/or user input. A close friend can include a UE, to which femtocell access can be granted by the femtocell owner or authorized user. Due to the length restriction of the access control list, only a limited number of UEs can be granted access to the femtocell. In an example scenario, the femtocell owner or authorized user can prefer to limit the access to the femtocell network for various factors, e.g. increase bandwidth, increase performance, increase Quality of Service and/or lower billing costs, etc. However, the methodology 900 enables the user to dynamically and automatically create/update the access control list in an efficient manner.

At 904, it can be determined whether an unoccupied entry is available in the access control list. If an unoccupied entry is available, at 906, the entry can be populated with information associated with the close friend (e.g., MSISDN, IMSI, etc.). If an unoccupied entry is not available, then at 908, it can be determined whether an entry within the access control list has a lower priority than that of the close friend. If an entry with lower priority is available, the lower priority entry can be replaced with information associated with the close friend (e.g., MSISDN, IMSI, etc.), as shown at 910. If all entries in the access control list have a higher priority than that of the close friend, then at 912, it can be determined whether a higher priority entry is occupied by a UE that is not within the femtocell range (and/or not likely to enter the femtocell coverage area). If a higher priority entry is occupied by a UE that is outside femtocell range and/or not likely to enter the femtocell coverage area, the higher priority entry can be replaced with the information associated with the close friend (e.g., MSISDN, IMSI, etc.), as shown at 914. Alternately, if all the higher priority entries in the access control list are within the femtocell coverage area, at 916, it can be determined whether a higher priority entry is occupied by a UE that is not likely to communicate over the femtocell network (e.g., by employing historical data, statistical and/or probabilistic analysis, status data, availability information etc.). If a higher priority entry is occupied by a UE that is not likely to communicate, the higher priority entry can be replaced with the information associated with the close friend (e.g., MSISDN, IMSI, etc.), as shown at 918. If UEs associated with all the higher priority entries are likely to communicate and/or are communicating over the femtocell network, the close friend cannot be granted access at this time.

Figure 10:
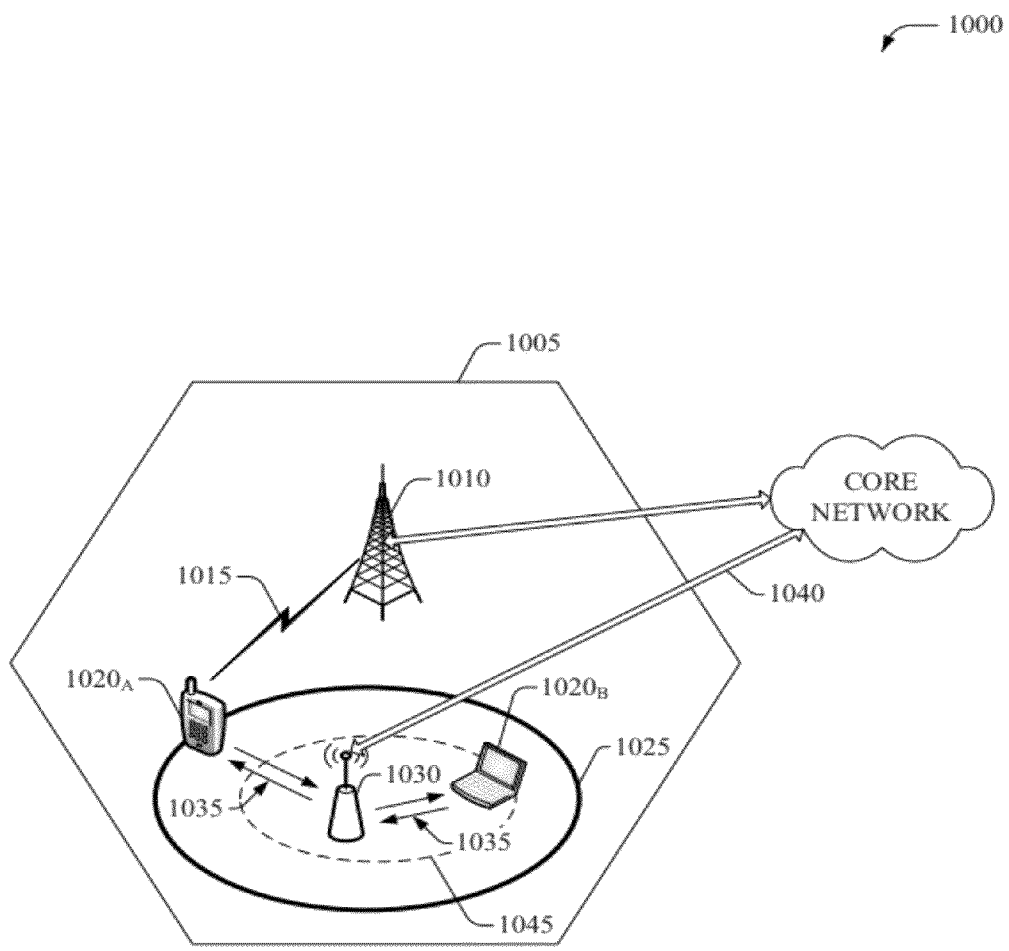
FIG. 10 illustrates an example wireless communication environment with associated components for operation of a femtocell in accordance with the subject specification.

FIG. 10 illustrates a schematic wireless environment 1000 (e.g., a network) in which a femtocell can exploit various aspects of the subject innovation in accordance with the disclosed subject matter. In wireless environment 1000, area 1005 can represent a coverage macro cell, which can be served by base station 1010. Macro coverage is generally intended for outdoors locations for servicing mobile wireless devices, like UE 1020$_A$, and such coverage is achieved via a wireless link 1015. In an aspect, UE 1020 can be a 3GPP Universal Mobile Telecommunication System (UMTS) mobile phone.

Within macro coverage cell 1005, a femtocell 1045, served by a femto access point 1030, can be deployed. A femtocell typically can cover an area 1025 that is determined, at least in part, by transmission power allocated to femto AP 1030, path loss, shadowing, and so forth. Coverage area typically can be spanned by a coverage radius that ranges from 20 to 50 meters. Confined coverage area 1045 is generally associated with an indoors area, or a building, which can span about 5000 sq. ft. Generally, femto AP 1030 typically can service a number (e.g., a few or more) wireless devices (e.g., subscriber station 1020$_B$) within confined coverage area 1045. In an aspect, femto AP 1030 can integrate seamlessly with substantially any PS-based and CS-based network; for instance, femto AP 1030 can integrate into an existing 3GPP Core via conventional interfaces like Iu-CS, Iu-PS, Gi, Gn. In another aspect, femto AP 1030 can exploit high-speed downlink packet access in order to accomplish substantive bitrates. In yet another aspect, femto AP 1030 has a LAC (location area code) and RAC (routing area code) that can be different from the underlying macro network. These LAC and RAC are used to identify subscriber station location for a variety of reasons, most notably to direct incoming voice and data traffic to appropriate paging transmitters.

As a subscriber station, e.g., UE 1020$_A$, can leave macro coverage (e.g., cell 1005) and enters femto coverage (e.g., area 1015), as illustrated in environment 1000. According to one aspect, the femto AP 1030 grant access to the subscriber stations, by employing a femto access manager (102) as described above. A carrier frequency scan can be triggered by the UE 1020$_A$, which can detect the femto AP 1030. UE 1020$_A$ can attempt to attach to the femto AP 1030 through transmission and reception of attachment signaling, effected via a FL/RL 1035; in an aspect, the attachment signaling can include a Location Area Update (LAU) and/or Routing Area Update (RAU). Attachment attempts are a part of procedures to ensure mobility, so voice calls and sessions can continue even after a macro-to-femto transition or vice versa. It is to be noted that UE 1020 can be employed seamlessly after either of the foregoing transitions. Femto networks are also designed to serve stationary or slow-moving traffic with reduced signaling loads compared to macro networks. A femto service provider (e.g., an entity that commercializes, deploys, and/or utilizes femto AP 1030) therefore can be inclined to minimize unnecessary LAU/RAU signaling activity at substantially any opportunity to do so, and through substantially any available means. It is to be noted that substantially any mitigation of unnecessary attachment signaling/control can be advantageous for femtocell operation.

Conversely, if not successful, UE 1020 generally can be commanded (through a variety of communication means) to select another LAC/RAC or enter "emergency calls only" mode. It is to be appreciated that this attempt and handling process can occupy significant UE battery, and femto AP capacity and signaling resources as well.

When an attachment attempt is successful, UE 1020 can be allowed on femtocell 1025, for example, by femtocell access manager 102, and incoming voice and data traffic can be paged and routed to the subscriber station through the femto AP 1030. It is to be noted also that data traffic is typically routed through a backhaul broadband wired network backbone 1040 (e.g., optical fiber backbone, twisted-pair line, T1/E1 phone line, DSL, or coaxial cable). It is to be noted that as a femto AP 1030 generally can rely on a backhaul network backbone 1040 for routing and paging, and for packet /communication, substantially any quality of service can handle heterogeneous packetized traffic. Namely, packet flows established for wireless communication devices (e.g., terminals 1020$_A$ and 1020$_B$) served by femto AP 1030, and for devices served through the backhaul network pipe 1040. It is to be noted that to ensure a positive subscriber experience, or perception, it is desirable for femto AP 1030 to maintain a high level of throughput for traffic (e.g., voice and data) utilized on a mobile device for one or more subscribers while in the presence of external, additional packetized, or broadband, traffic associated with applications (e.g., web browsing, data transfer (e.g., content upload), and the like) executed in devices within the femto coverage area (e.g., area 1025 or area 1045).

Figure 11:
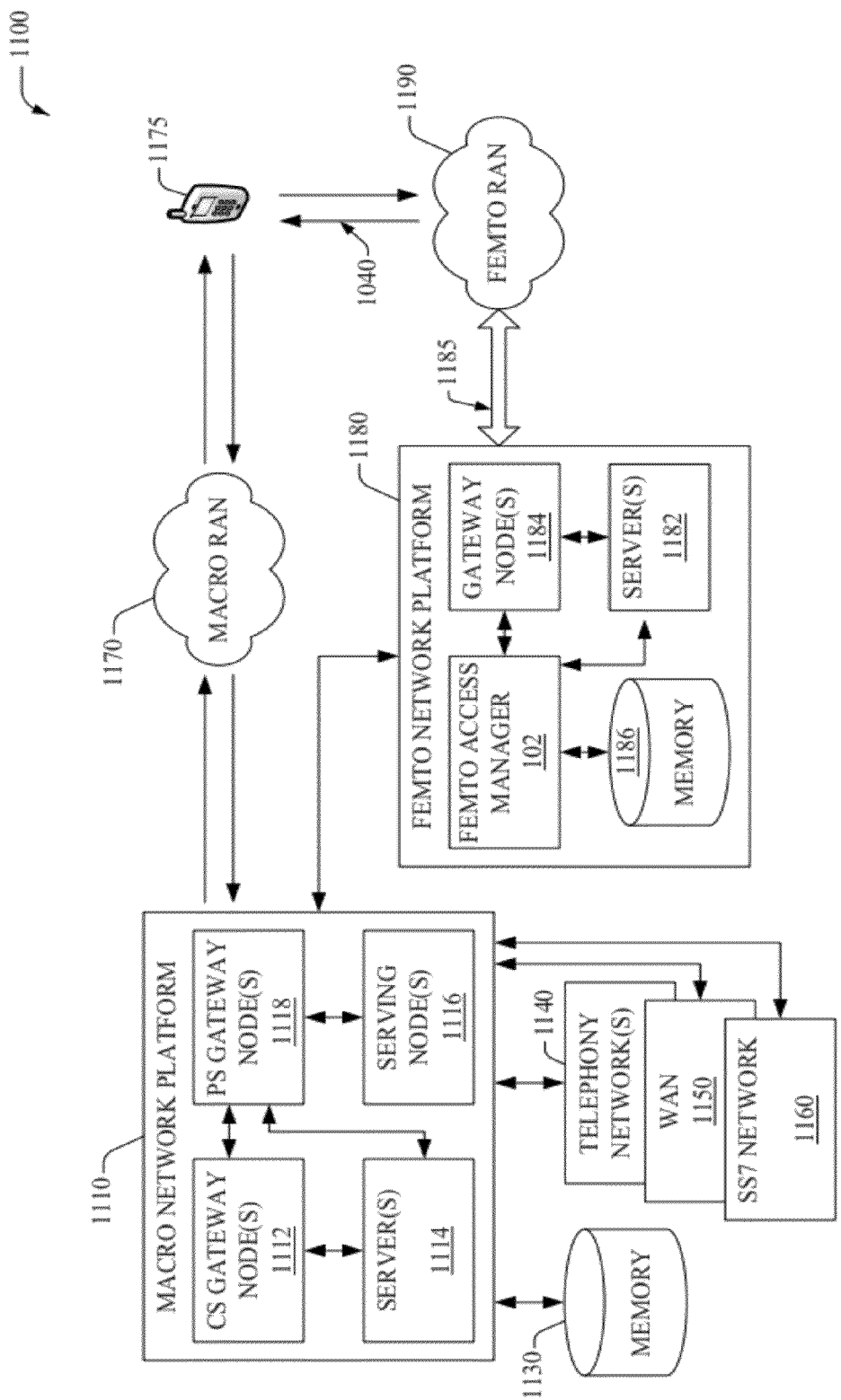
FIG. 11 illustrates a schematic deployment of a macro cell and a femtocell for wireless coverage in accordance with aspects of the disclosure.
Figure 12:
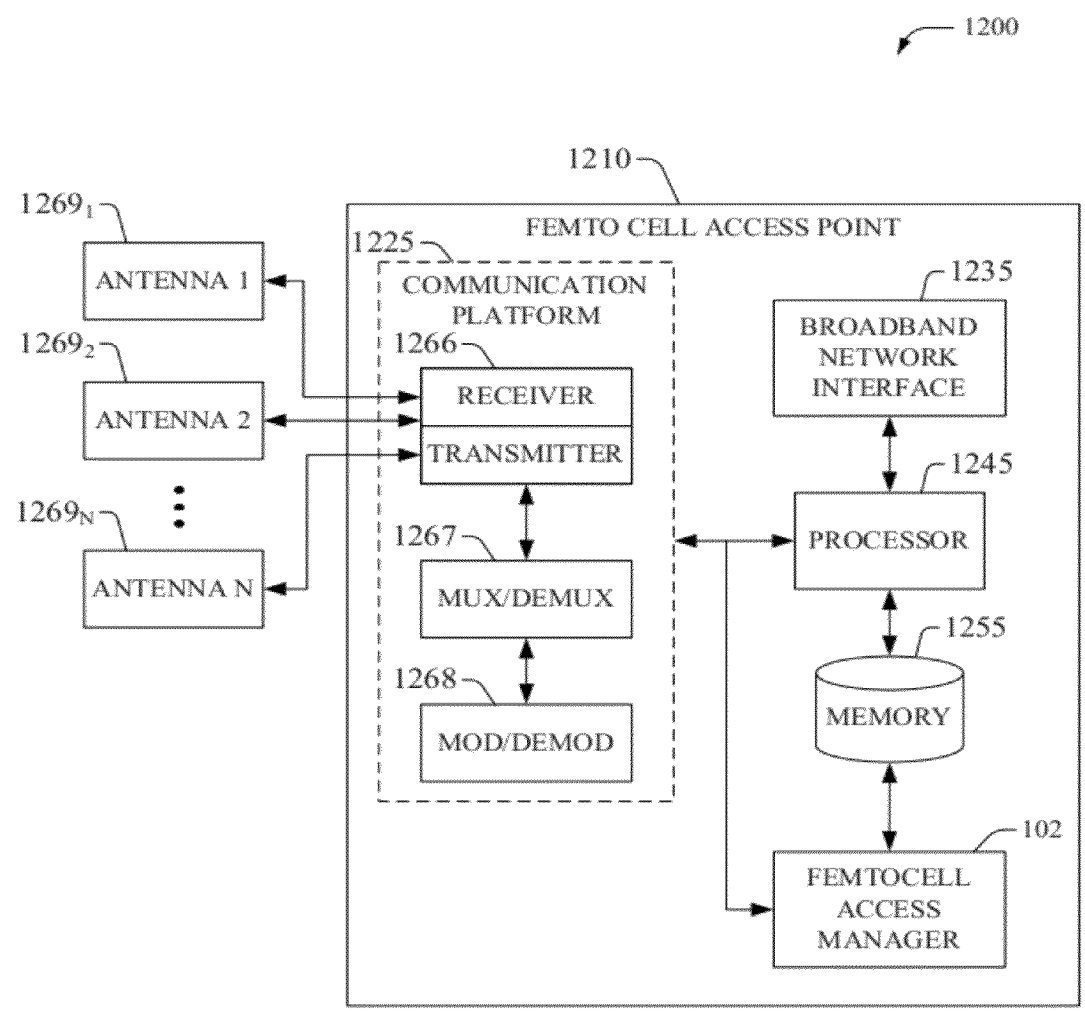
FIG. 12 illustrates an example embodiment of a femto access point that can facilitate femto access provisioning, according to the subject disclosure.

To provide further context for various aspects of the subject specification, FIGS. 11 and 12 illustrate, respectively, an example wireless communication environment 1100, with associated components for operation of a femtocell, and a block diagram of an example embodiment 1200 of a femto access point, which can facilitate automatic/dynamic femtocell access provisioning in accordance with aspects described herein.

Wireless communication environment 1100 includes two wireless network platforms: (i) A macro network platform 1110 that serves, or facilitates communication) with user equipment 1175 via a macro radio access network (RAN) 1170. It should be appreciated that in cellular wireless technologies (e.g., 3GPP UMTS, HSPA, 3GPP LTE, 3GPP UMB), macro network platform 1110 is embodied in a Core Network. (ii) A femto network platform 1180, which can provide communication with UE 1175 through a femto RAN 1190 linked to the femto network platform 1180 via backhaul pipe(s) 1185, wherein backhaul pipe(s) are substantially the same a backhaul link 1040. It should be appreciated that femto network platform 1180 typically offloads UE 1175 from macro network, once UE 1175 attaches (e.g., through macro-to-femto handover, or via a scan of channel resources in idle mode) to femto RAN. According to an aspect, the femto access manager 102, can populate an access control list and determine whether UE 1175, can be garneted access to the femto RAN 1190. Further, it can be appreciated that the femto access manager 102 can include functionality, more fully described herein, for example, with respect to systems 100, 200, 400, 500, 600, and 700.

It is noted that RAN includes base station(s), or access point(s), and its associated electronic circuitry and deployment site(s), in addition to a wireless radio link operated in accordance with the base station(s). Accordingly, macro RAN 1170 can comprise various coverage cells like cell 1005, while femto RAN 1190 can comprise multiple femtocell access points. As mentioned above, it is to be appreciated that deployment density in femto RAN 1190 is substantially higher than in macro RAN 1170.

Generally, both macro and femto network platforms 1110 and 1180 can include components, e.g., nodes, gateways, interfaces, servers, or platforms, that facilitate both packet-switched (PS) and circuit-switched (CS) traffic (e.g., voice and data) and control generation for networked wireless communication. For example, macro network platform 1110 includes CS gateway node(s) 1112 which can interface CS traffic received from legacy networks like telephony network(s) 1140 (e.g., public switched telephone network (PSTN), or public land mobile network (PLMN)) or a SS7 network 1160. Moreover, CS gateway node(s) 1112 interfaces CS-based traffic and signaling and gateway node(s) 1118.

In addition to receiving and processing CS-switched traffic and signaling, gateway node(s) 1118 can authorize and authenticate PS-based data sessions with served (e.g., through macro RAN) wireless devices. Data sessions can include traffic exchange with networks external to the macro network platform 1110, like wide area network(s) (WANs) 1150; it should be appreciated that local area network(s) (LANs) can also be interfaced with macro network platform 1110 through gateway node(s) 1118. Gateway node(s) 1118 generates packet data contexts when a data session is established. It should be further appreciated that the packetized communication can include multiple flows that can be generated through server(s) 1114. Macro network platform 1110 also includes serving node(s) 1116 that convey the various packetized flows of information, or data streams, received through gateway node(s) 1118. It is to be noted that server(s) 1114 can include one or more processor configured to confer at least in part the functionality of macro network platform 1110. To that end, the one or more processor can execute code instructions stored in memory 1130, for example.

In example wireless environment 1100, memory 1130 stores information related to operation of macro network platform 1110. Information can include business data associated with subscribers; market plans and strategies, e.g., promotional campaigns, business partnerships; operational data for mobile devices served through macro network platform; service and privacy policies; end-user service logs for law enforcement; and so forth. Memory 1130 can also store information from at least one of telephony network(s) 1140, WAN(s) 1150, or SS7 network 1160.

Femto gateway node(s) 1184 have substantially the same functionality as PS gateway node(s) 1118. Additionally, femto gateway node(s) 1184 can also include substantially all functionality of serving node(s) 1116. In an aspect, femto gateway node(s) 1184 facilitates handover resolution, e.g., assessment and execution. Server(s) 1182 have substantially the same functionality as described in connection with server(s) 1114 and can include one or more processor configured to confer at least in part the functionality of macro network platform 1110. To that end, the one or more processor can execute code instructions stored in memory 1186, for example.

Memory 1186 can include information relevant to operation of the various components of femto network platform 1180. For example operational information that can be stored in memory 1186 can comprise, but is not limited to, subscriber information; contracted services; maintenance and service records; femtocell configuration (e.g., devices served through femto RAN 1190; access control lists, or white lists); service policies and specifications; privacy policies; add-on features; and so forth. It can be appreciated that although femto access manager 102 is illustrated within the femto network platform 1180, the femto access manager 102 can be located within a disparate UE (belonging to an authorized user/owner) and/or the macro network platform 1110.

With respect to FIG. 12, in example embodiment 1200, femtocell AP 1210 can receive and transmit signal(s) (e.g., traffic and control signals) from and to wireless devices, access terminals, wireless ports and routers, etc., through a set of antennas $1269_1$-$1269_N$. It should be appreciated that while antennas $1269_1$-$1269_N$ are a part of communication platform 1225, which comprises electronic components and associated circuitry that provides for processing and manipulating of received signal(s) (e.g., a packet flow) and signal(s) (e.g., a broadcast control channel) to be transmitted. In an aspect, communication platform 1225 includes a transmitter/receiver (e.g., a transceiver) 1266 that can convert signal(s) from analog format to digital format upon reception, and from digital format to analog format upon transmission. In addition, receiver/transmitter 1266 can divide a single data stream into multiple, parallel data streams, or perform the reciprocal operation. Coupled to transceiver 1266 is a multiplexer/demultiplexer 1267 that facilitates manipulation of signal in time and frequency space. Electronic component 1267 can multiplex information (data/traffic and control/signaling) according to various multiplexing schemes such as time division multiplexing (TDM), frequency division multiplexing (FDM), orthogonal frequency division multiplexing (OFDM), code division multiplexing (CDM), space division multiplexing (SDM). In addition, mux/demux component 1267 can scramble and spread information (e.g., codes) according to substantially any code known in the art; e.g., Hadamard-Walsh codes, Baker codes, Kasami codes, polyphase codes, and so on. A modulator/demodulator 1268 is also a part of operational group 1225, and can modulate information according to multiple modulation techniques, such as frequency modulation, amplitude modulation (e.g., M-ary quadrature amplitude modulation (QAM), with M a positive integer), phase-shift keying (PSK), and the like.

Femto access point 1210 also includes a processor 1245 configured to confer functionality, at least partially, to substantially any electronic component in the femto access point 1210, in accordance with aspects of the subject innovation. In particular, processor 1245 can facilitate femto AP 1210 to implement configuration instructions received through communication platform 1225, which can include storing data in memory 1255. In addition, processor 1245 facilitates femto AP 1210 to process data (e.g., symbols, bits, or chips) for multiplexing/demultiplexing, such as effecting direct and inverse fast Fourier transforms, selection of modulation rates, selection of data packet formats, inter-packet times, etc. Moreover, processor 1245 can manipulate antennas $1269_1$-$1269_N$ to facilitate beamforming or selective radiation pattern formation, which can benefit specific locations (e.g., basement, home office . . . ) covered by femto AP; and exploit substantially any other advantages associated with smart-antenna technology. Memory 1255 can store data structures, code instructions, system or device information like device identification codes (e.g., IMEI, MSISDN, serial number . . . ) and specification such as multimode capabilities; code sequences for scrambling; spreading and pilot transmission, floor plan configuration, access point deployment and frequency plans; and so on. Moreover, memory 1255 can store configuration information such as schedules and policies; femto AP address(es) or geographical indicator(s); access control lists (e.g., white lists); license(s) for utilization of add-features for femto AP 1210, and so forth.

In embodiment 1200, processor 1245 is coupled to the memory 1255 in order to store and retrieve information necessary to operate and/or confer functionality to communication platform 1225, broadband network interface 1235 (e.g., a broadband modem), and other operational components (e.g., multimode chipset(s), power supply sources . . . ; not shown) that support femto access point 1210. The femto AP 1210 can further include (or be operatively coupled to) a femtocell access manager 102, which can include functionality, as more fully described herein, for example, with regard to systems 100, 200, 400, 500, 600, and 700. In addition, it is to be noted that the various aspects disclosed in the subject specification can also be implemented through (i) program modules stored in a computer-readable storage medium or memory (e.g., memory 1186 or memory 1255) and executed by a processor (e.g., processor 1245), or (ii) other combination(s) of hardware and software, or hardware and firmware.

Figure 13:
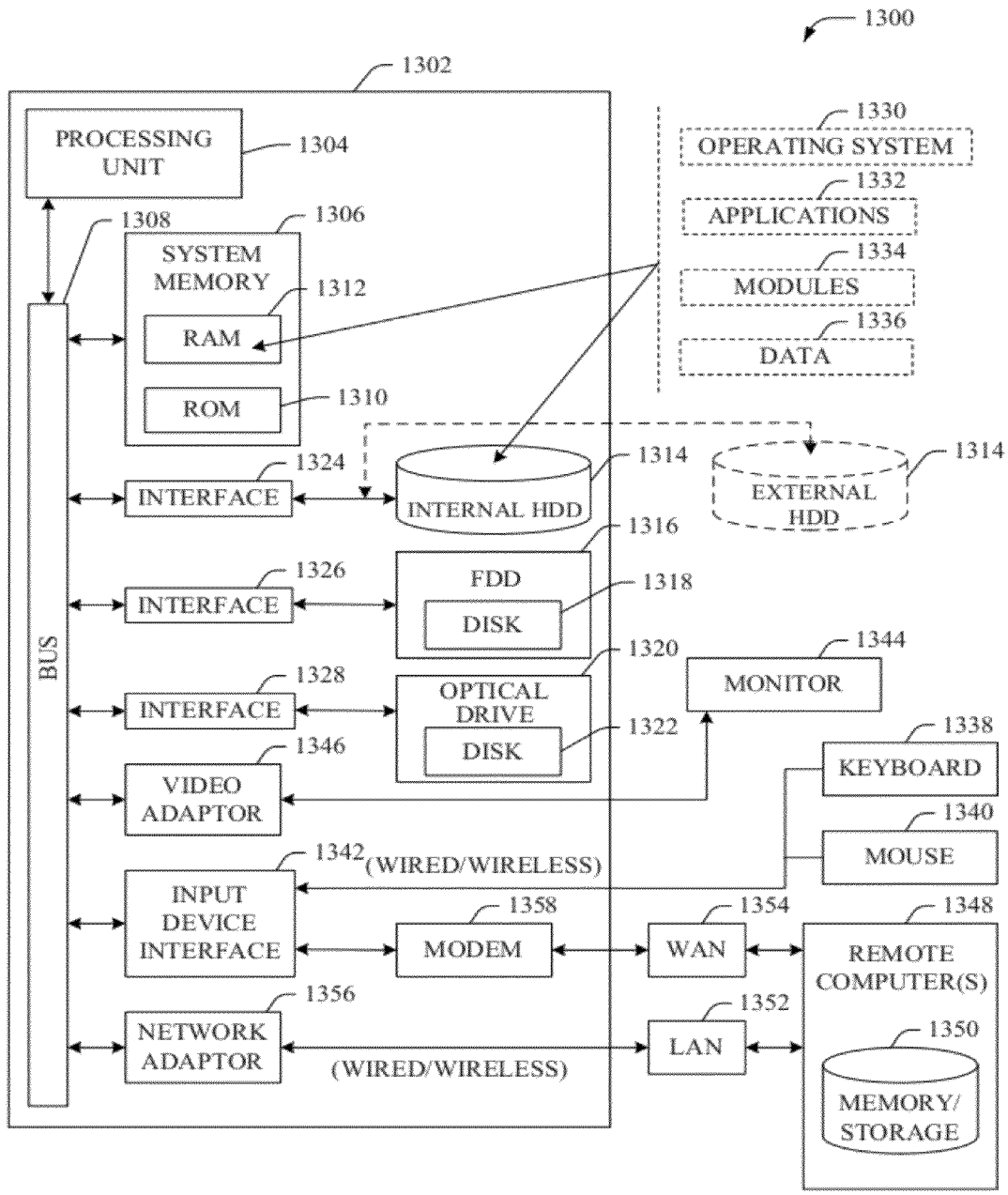
FIG. 13 illustrates a block diagram of a computer operable to execute the disclosed communication architecture.

Referring now to FIG. 13, there is illustrated a block diagram of a computer operable to execute the disclosed communication architecture. In order to provide additional context for various aspects of the subject specification, FIG. 13 and the following discussion are intended to provide a brief, general description of a suitable computing environment 1300 in which the various aspects of the specification can be implemented. While the specification has been described above in the general context of computer-executable instructions that can run on one or more computers, those skilled in the art will recognize that the specification also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the specification can also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes both volatile and nonvolatile media, removable and non-removable media. By way of example, and not limitation, computer-readable media can comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

With reference again to FIG. 13, the example environment 1300 for implementing various aspects of the specification includes a computer 1302, the computer 1302 including a processing unit 1304, a system memory 1306 and a system bus 1308. The system bus 1308 couples system components including, but not limited to, the system memory 1306 to the processing unit 1304. The processing unit 1304 can be any of various commercially available processors. Dual microprocessors and other multi-processor architectures can also be employed as the processing unit 1304.

The system bus 1308 can be any of several types of bus structure that can further interconnect to a memory bus (with or without a memory controller), a peripheral bus, and a local bus using any of a variety of commercially available bus architectures. The system memory 1306 includes read-only memory (ROM) 1310 and random access memory (RAM) 1312. A basic input/output system (BIOS) is stored in a non-volatile memory 1310 such as ROM, EPROM, EEPROM, which BIOS contains the basic routines that help to transfer information between elements within the computer 1302, such as during start-up. The RAM 1312 can also include a high-speed RAM such as static RAM for caching data.

The computer 1302 further includes an internal hard disk drive (HDD) 1314 (e.g., EIDE, SATA), which internal hard disk drive 1314 can also be configured for external use in a suitable chassis (not shown), a magnetic floppy disk drive (FDD) 1316, (e.g., to read from or write to a removable diskette 1318) and an optical disk drive 1320, (e.g., reading a CD-ROM disk 1322 or, to read from or write to other high capacity optical media such as the DVD). The hard disk drive 1314, magnetic disk drive 1316 and optical disk drive 1320 can be connected to the system bus 1308 by a hard disk drive interface 1324, a magnetic disk drive interface 1326 and an optical drive interface 1328, respectively. The interface 1324 for external drive implementations includes at least one or both of Universal Serial Bus (USB) and IEEE 1394 interface technologies. Other external drive connection technologies are within contemplation of the subject specification.

The drives and their associated computer-readable media provide nonvolatile storage of data, data structures, computer-executable instructions, and so forth. For the computer 1302, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, can also be used in the example operating environment, and further, that any such media can contain computer-executable instructions for performing the methods of the specification.

A number of program modules can be stored in the drives and RAM 1312, including an operating system 1330, one or more application programs 1332, other program modules 1334 and program data 1336. All or portions of the operating system, applications, modules, and/or data can also be cached in the RAM 1312. It is appreciated that the specification can be implemented with various commercially available operating systems or combinations of operating systems.

A user can enter commands and information into the computer 1302 through one or more wired/wireless input devices, e.g., a keyboard 1338 and a pointing device, such as a mouse 1340. Other input devices (not shown) can include a microphone, an IR remote control, a joystick, a game pad, a stylus pen, touch screen, or the like. These and other input devices are often connected to the processing unit 1304 through an input device interface 1342 that is coupled to the system bus 1308, but can be connected by other interfaces, such as a parallel port, an IEEE 1394 serial port, a game port, a USB port, an IR interface, etc.

A monitor 1344 or other type of display device is also connected to the system bus 1308 via an interface, such as a video adapter 1346. In addition to the monitor 1344, a computer typically includes other peripheral output devices (not shown), such as speakers, printers, etc.

The computer 1302 can operate in a networked environment using logical connections via wired and/or wireless communications to one or more remote computers, such as a remote computer(s) 1348. The remote computer(s) 1348 can be a workstation, a server computer, a router, a personal computer, portable computer, microprocessor-based entertainment appliance, a peer device or other common network node, and typically includes many or all of the elements described relative to the computer 1302, although, for purposes of brevity, only a memory/storage device 1350 is illustrated. The logical connections depicted include wired/wireless connectivity to a local area network (LAN) 1352 and/or larger networks, e.g., a wide area network (WAN) 1354. Such LAN and WAN networking environments are commonplace in offices and companies, and facilitate enterprise-wide computer networks, such as intranets, all of which can connect to a global communications network, e.g., the Internet.

When used in a LAN networking environment, the computer 1302 is connected to the local network 1352 through a wired and/or wireless communication network interface or adapter 1356. The adapter 1356 can facilitate wired or wireless communication to the LAN 1352, which can also include a wireless access point disposed thereon for communicating with the wireless adapter 1356.

When used in a WAN networking environment, the computer 1302 can include a modem 1358, or is connected to a communications server on the WAN 1354, or has other means for establishing communications over the WAN 1354, such as by way of the Internet. The modem 1358, which can be internal or external and a wired or wireless device, is connected to the system bus 1308 via the serial port interface 1342. In a networked environment, program modules depicted relative to the computer 1302, or portions thereof, can be stored in the remote memory/storage device 1350. It will be appreciated that the network connections shown are example and other means of establishing a communications link between the computers can be used.

The computer 1302 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

In the subject specification, terms such as "data store," data storage," "database," and substantially any other information storage component relevant to operation and functionality of a component, refer to "memory components," or entities embodied in a "memory" or components comprising the memory. It will be appreciated that the memory components, or computer-readable storage media, described herein can be either volatile memory or nonvolatile memory, or can include both volatile and nonvolatile memory.

By way of illustration, and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

What has been described above includes examples of the present specification. It is, of course, not possible to describe every conceivable combination of components or methodologies for purposes of describing the present specification, but one of ordinary skill in the art may recognize that many further combinations and permutations of the present specification are possible. Accordingly, the present specification is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system, comprising:
    a memory to store executable instructions; and
    a processor coupled to the memory that facilitates execution of the executable instructions to perform operations, the operations comprising:
        determining data indicative of a set of user equipment based on determining that first likelihood information representative of a first likelihood of the set of user equipment being granted access to a femto access point device satisfies a first defined criterion,
        populating an access control data structure associated with the femto access point device with first identifier data related to a first user equipment that is selected from the set of user equipment based on priority data comprising a set of respective access priorities assigned to the set of user equipment,
        based on determining that the first user equipment has been assigned status data representing a busy status, verifying that second likelihood information, representative of a second likelihood of the first user equipment communicating via the femto access point device, satisfies a second defined criterion, and
        in response to the verifying, replacing the first identifier data with second identifier data related to a second user equipment of the set of user equipment, wherein the first user equipment is assigned a first access priority of the set of respective priorities that is higher than a second access priority of the set of respective priorities that is assigned to the second user equipment.

2. The system of claim 1, wherein the operations further comprise:
    analyzing access data associated with a subscriber device related to the femto access point device to facilitate the determining of the data.

3. The system of claim 2, wherein the operations further comprise:
    ranking the set of user equipment based on the priority data.

4. The system of claim 2, wherein the access data comprises social network information received from a social network device associated with the subscriber device.

5. The system of claim 2, wherein the access data comprises calendar data associated with the subscriber device.

6. The system of claim 1, wherein the replacing comprises replacing the first identifier data in response to determining that the access control data structure does not comprise an unoccupied slot.

7. The system of claim 1, wherein the status data is first status data and the verifying comprises verifying that the second likelihood information satisfies the second defined criterion based on determining that the first user equipment has been assigned second status data representing a do not disturb status.

8. The system of claim 1, wherein the operations further comprise:
    determining the second likelihood information based on historical data representing a communication history associated with the first user equipment.

9. The system of claim 4, wherein the social network information represents a relationship strength associated with a relationship between the subscriber device and the first user equipment, wherein the first access priority is determined based on the relationship strength.

10. The system of claim 1, wherein the status data is first status data and the verifying comprises verifying that the second likelihood information satisfies the second defined criterion based on determining that the first user equipment has been assigned second status data representing a sleeping status.

11. A method, the method comprising:
based on an analysis of access data that facilitates provisioning of a femto access point device, determining, by a system comprising a processor, first identifier data associated with a first user equipment based on first likelihood data indicative of a first likelihood of the first user equipment being granted access to the femto access point device;
based on determining that a second user equipment within a coverage area of the femto access point device has been assigned status data representing a busy status, verifying, by the system, that second likelihood data indicative of a second likelihood of the second user equipment communicating via the femto access point device, satisfies a defined criterion; and
in response to the verifying, replacing, by the system, second identifier data that is associated with the second user equipment and that is stored within an access control data structure of the femto access point device, with the first identifier data, wherein a first access priority assigned to the first user equipment is lower than a second access priority assigned to the second user equipment.

12. The method of claim 11, further comprising:
receiving, by the system, the access data comprising receiving contact information from social network service data.

13. The method of claim 11, further comprising:
determining, by the system, the first access priority and the second access priority based on defined preference data.

14. The method of claim 11, further comprising:
determining, by the system, the second likelihood data based on historical data associated with a set of communication sessions associated with the second user equipment.

15. The method of claim 11, wherein the replacing comprises replacing the second identifier data in response to determining that a set of entries of the access control data structure is occupied.

16. The method of claim 11, wherein the status data is first status data and the verifying comprises verifying that the second likelihood satisfies the defined criterion based on determining that the second user equipment has been assigned second status data representing a sleeping status.

17. The method of claim 11, wherein the status data is first status data and the verifying comprises verifying that the second likelihood satisfies the defined criterion based on determining that the second user equipment has been assigned second status data representing a do not disturb status.

18. A computer-readable storage device comprising computer-executable instructions that, in response to execution, cause a system comprising a processor to perform operations, the operations comprising:
based on an analysis of access data associated with a subscriber device, determining a set of user equipment in accordance with determining first likelihood data that represents a first likelihood of the set of user equipment being authorized to access a femto access point device associated with the subscriber device;
updating an access control data structure associated with the femto access point device with first identifier data associated with a first user equipment of the set of user equipment in response to determining that a first access priority assigned to the first user equipment satisfies an access criterion;
based on determining that the first user equipment has been assigned status data representing a busy status, verifying that second likelihood information, representative of a second likelihood of the first user equipment communicating via the femto access point device, satisfies a second defined criterion; and
in response to the verifying, replacing the first identifier data with second identifier data associated with a second user equipment of the set of user equipment, wherein the first access priority is higher than a second access priority assigned to the second user equipment.

19. The computer-readable storage device of claim 18, further comprising:
receiving the access data comprising receiving social network service data associated with the subscriber device.

20. The computer-readable storage device of claim 18, further comprising:
receiving the access data comprising, receiving, from a network device, transactional data associated with the subscriber device.

* * * * *